US011740494B2

(12) United States Patent
Yu et al.

(10) Patent No.: US 11,740,494 B2
(45) Date of Patent: *Aug. 29, 2023

(54) INTEGRATION OF PHOTONIC COMPONENTS ON SOI PLATFORM

(71) Applicant: ROCKLEY PHOTONICS LIMITED, Altrincham (GB)

(72) Inventors: Guomin Yu, Glendora, CA (US); Aaron John Zilkie, Pasadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,945

(22) Filed: May 6, 2022

(65) Prior Publication Data

US 2022/0260863 A1    Aug. 18, 2022

Related U.S. Application Data

(63) Continuation of application No. 17/055,114, filed as application No. PCT/EP2019/062374 on May 14, 2019, now Pat. No. 11,327,343.

(Continued)

(51) Int. Cl.
*G02F 1/017* (2006.01)
*G02B 6/12* (2006.01)
(Continued)

(52) U.S. Cl.
CPC ............ *G02F 1/01708* (2013.01); *G02B 6/12* (2013.01); *G02F 1/0157* (2021.01); *G02F 1/025* (2013.01);
(Continued)

(58) Field of Classification Search
CPC .... G02F 1/01708; G02F 1/0157; G02F 1/025; G02F 2201/066; G02F 1/0155;
(Continued)

(56) References Cited

U.S. PATENT DOCUMENTS 10,809,547 B2    10/2020 Yu et al.
10,831,043 B2    11/2020 Yu et al.
(Continued)

FOREIGN PATENT DOCUMENTS

WO    2019166875 A1    9/2019

OTHER PUBLICATIONS

International Search Report and Written Opinion of the International Searching Authority, dated Jul. 4, 2019, Corresponding to PCT/EP2019/062374, 13 pages.

(Continued)

*Primary Examiner* — John Bedtelyon
(74) *Attorney, Agent, or Firm* — Lewis Roca Rothgerber Christie LLP

(57) ABSTRACT

An electro-optically active device comprising: a silicon on insulator (SOI) substrate including a silicon base layer, a buried oxide (BOX) layer on top of the silicon base layer, a silicon on insulator (SOI) layer on top of the BOX layer, and a substrate cavity which extends through the SOI layer, the BOX layer and into the silicon base layer, such that a base of the substrate cavity is formed by a portion of the silicon base layer; an electro-optically active waveguide including an electro-optically active stack within the substrate cavity; and a buffer region within the substrate cavity beneath the electro-optically active waveguide, the buffer region comprising a layer of Ge and a layer of GaAs.

17 Claims, 32 Drawing Sheets

Related U.S. Application Data

(60) Provisional application No. 62/671,830, filed on May 15, 2018.

(51) Int. Cl.
 *G02F 1/015* (2006.01)
 *G02F 1/025* (2006.01)

(52) U.S. Cl.
 CPC .............. *G02B 2006/12078* (2013.01); *G02F 2201/066* (2013.01)

(58) Field of Classification Search
 CPC ............ G02B 6/12; G02B 2006/12078; G02B 6/12004; G02B 6/132; G02B 2006/12061
 See application file for complete search history.

(56) References Cited

U.S. PATENT DOCUMENTS

| | | |
|---|---|---|
| 11,075,498 B2 | 7/2021 | Yu |
| 11,126,020 B2 | 9/2021 | Yu et al. |
| 11,327,343 B2 * | 5/2022 | Yu ............................ G02F 1/025 |
| 2010/0330727 A1 | 12/2010 | Hill et al. |
| 2016/0103278 A1 | 4/2016 | Cheng et al. |
| 2016/0276807 A1 * | 9/2016 | Cai .......................... H01S 5/026 |
| 2017/0170632 A1 | 6/2017 | Leobandung et al. |

OTHER PUBLICATIONS

Jung, D. et al., "Low threshold current 1.3 μ Fabry-Perot III-V quantum dot lasers on (001) Si with superior reliability", OFC, 2018, 3 pages, OSA.

Liu, A. W. K et al., "Monolithic Integration of InP-based Transistors on Si substrates using MBE", 15th International Conference on Molecular Beam Epitaxy, Aug. 3-8, 2008, University of British Columbia, Vancouver, Canada, 27 pages, IQE.

Liu, W. K. et al., "Monolithic integration of InP-based transistors on Si substrates using MBE", Journal of Crystal Growth, 2008, vol. 311, pp. 1979-1983, Elsevier B.V.

U.K. Intellectual Property Office Search Report, dated Oct. 25, 2019, for Patent Application No. GB1906795.8, 5 pages.

U.K. Intellectual Property Office Search Report, dated Apr. 6, 2020, for Patent Application No. GB1906795.8, 3 pages.

U.S. Notice of Allowance, dated Jan. 13, 2022, for U.S. Appl. No. 17/055,114, 10 pages.

* cited by examiner

CC' direction

DD' direction

BB'

CC'

BB'

CC'

BB'

CC'

BB'

CC'

BB' direction

CC' direction

BB' direction

CC' direction

INTEGRATION OF PHOTONIC COMPONENTS ON SOI PLATFORM

CROSS-REFERENCE TO RELATED APPLICATION(S)

The present application is a continuation of U.S. patent application Ser. No. 17/055,114, filed Nov. 12, 2020, which is a national stage entry, under 35 U.S.C. § 371, of International Application Number PCT/EP2019/062374, filed on May 14, 2019, which claims priority to and the benefit of U.S. Provisional Patent Application No. 62/671,830, filed May 15, 2018; the entire contents of all of the applications identified in this paragraph are incorporated herein by reference.

FIELD OF THE INVENTION

The present invention relates to integration of a photonic component on an SOI platform using a buffer region and particularly, although not exclusively, to integration of components utilising III-V materials onto a SOI substrate.

BACKGROUND

Electro-absorption modulators formed of III-V materials (III-V EAMs) are used to modulate light in optical systems.

Silicon on insulator (SOI) wafers may be used as a substrate on which optical components and/or circuits may be formed. However, monolithic integration of an III-V EAM on a SOI substrate has not been successful due to the lattice mismatch between Si and III-V materials.

The present invention has been devised in light of the above considerations.

SUMMARY OF THE INVENTION

In a first aspect, the invention may provide an electro-optically active device comprising: a silicon on insulator (SOI) substrate including a silicon base layer, a buried oxide (BOX) layer on top of the silicon base layer, a SOI layer on top of the BOX layer, and a substrate cavity which extends through the SOI layer, the BOX layer and into the silicon base layer, such that a base of the substrate cavity is formed by a portion of the silicon base layer; an electro-optically active waveguide including an electro-optically active stack within the substrate cavity; and a buffer region within the substrate cavity beneath the electro-optically active waveguide, the buffer region comprising a layer of Ge and a layer of GaAs.

The buffer region allows better integration of the electro-optically active waveguide with the SOI substrate as the buffer region modifies the lattice structure on which the waveguide is formed. This device with the buffer region may be utilised as a template on which electro-optically active and/or passive waveguides may be formed.

The buffer region may comprise a layer of graded InAlAs. The buffer region may comprise a layer of InGaAs or InP. The buffer region may comprise: a layer of InGaAs or InP, said layer located on top of a layer of graded InAlAs, the layer of graded InAlAs located on top of the layer of GaAs, the layer of GaAs located on top of the layer of Ge.

The layer of Ge may have a thickness of 1000 nm+/−20%, and/or the layer of GaAs may have a thickness of 1000 nm+/−20%, and/or the layer of graded InAlAs may have a thickness of 1300 nm+/−30%, and/or the layer of InGaAs or InP may have a thickness of 500 nm-1000 nm.

The buffer region may consist of intrinsic or unintentionally doped (uid) materials. The buffer region may be epitaxially grown onto the base of the substrate cavity. Epitaxial growth of the buffer region on the base of the substrate cavity improves the integration of the buffer region with the silicon base layer at the base of the substrate cavity. A layer which has been epitaxially grown may be detectable by microscope and/or SEM by virtue of the structure formed.

The electro-optically active stack may be located directly on top of the buffer region. The electro-optically active stack may be epitaxially grown on the buffer region. Epitaxial growth of the electro-optically active stack on the buffer region improves the integration of the stack with the buffer region.

An interface between the electro-optically active stack and the buffer region may be positioned deeper in the substrate cavity than an interface between the silicon base layer and the BOX layer in the SOI substrate, such that a portion of the electro-optically active stack may be positioned at the same height as a portion of the silicon base layer.

The electro-optically active stack may comprise a layer of a III-V semiconductor. The III-V semiconductor may be monolithically integrated with the SOI due to the presence of the buffer region. The stack may be an III-V EPI stack and the III-V EPI stack may include MQW and/or bulk III-V materials.

The electro-optically active stack may include a multiple quantum well region.

The electro-optically active stack may form an electro-absorption modulator (EAM). The EAM may be an III-V EAM and/or the EAM may include a device utilising the quantum confined stark effect (QCSE) and/or the Franz Keld (FK) effect. The electro-optically active waveguide may be configured such that optical properties of the electro-optically active waveguide are modifiable according to the QCSE effect or the FK effect.

The electro-optically active device may comprise a channel between the electro-optically active stack and a sidewall of the substrate cavity; wherein the channel may be filled with a liner and a filling material with a refractive index similar to or greater than that of a material forming a sidewall of the substrate cavity to thereby form a bridge-waveguide in the channel between the SOI layer and the electro-optically active stack. The filling material may be amorphous silicon or silicon-germanium (SiGe), and the liner may be formed of silicon nitride ($Si_3N_4$). A bottom surface of the filling material may be aligned with a top surface of the BOX layer.

A top surface of the electro-optically active stack may be positioned higher than a top surface of the SOI layer such that a portion of the electro-optically active stack protrudes from the substrate cavity.

The electro-optically active device may comprise a layer of silicon nitride ($Si_3N_4$) on top of the SOI layer, a top surface of the silicon nitride having a height above the SOI substrate equal to a height of the portion of the electro-optically active stack that protrudes from the substrate cavity, such that a top surface of the layer of silicon nitride is aligned with the top surface of the electro-optically active stack.

The electro-optically active device may comprise: a first electrode contact on a first doped region, the first doped region forming a lowest layer of the electro-optically active stack; an isolation cavity in the first doped region; an insulating material located on a side surface of the electro-optically active stack and extending into the isolation cavity in the first doped region and lining the isolation cavity; and a second electrode contact on a second doped region, the second doped region forming a top layer of the electro-optically active stack, the contact extending from the second doped region along the insulating material and into the isolation cavity in the first doped region.

The composition of the electro-optically active devices and the properties and/or heights of the layers may be detectable using optical microscopes and/or SEM.

In a second aspect, the invention may provide a method of producing an electro-optically active device, the method comprising the steps of: providing a silicon on insulator (SOI) substrate including a silicon base layer, a buried oxide (BOX) layer on top of the silicon base layer, and a silicon on insulator (SOI) layer on top of the BOX layer; etching a substrate cavity in a part of the silicon on insulator (SOI) substrate through the SOI layer, through the BOX layer and into the silicon base layer; forming a buffer region within the substrate cavity, the step of forming a buffer region comprising epitaxially growing a layer of Ge and epitaxially growing a layer of GaAs; epitaxially growing an electro-optically active stack within the substrate cavity and on top of the buffer region; etching the electro-optically active stack to form an electro-optically active waveguide; and etching the SOI substrate to form a SOI waveguide, the SOI waveguide being configured to direct light waves through the electro-optically active wave guide.

The step of forming a buffer region within the substrate cavity may comprise epitaxially growing a layer of graded InAlAs. The step of forming a buffer region within the substrate cavity may comprise epitaxially growing a layer of InGaAs or InP.

The step of forming a buffer region within the substrate cavity may comprise: epitaxially growing the layer of Ge on a portion of the silicon base layer that forms a base of the substrate cavity, followed by: epitaxially growing the layer of GaAs on the layer of Ge, followed by: epitaxially growing a layer of graded InAlAs on the layer of GaAs, followed by: epitaxially growing a layer of InGaAs or InP on the layer of graded InAlAs.

An interface between the electro-optically active stack and the buffer region may be positioned deeper in the substrate cavity than an interface between the silicon base layer and the BOX layer in the SOI substrate, such that a portion of the electro-optically active stack is positioned at the same height as a portion of the silicon base layer.

The method may comprise the step of: before etching the substrate cavity, depositing a silicon nitride layer on the SOI substrate, such that a top surface of the silicon nitride has a first height above the SOI substrate, wherein, after the electro-optically active stack is grown, a portion of the electro-optically active stack protrudes from the substrate cavity by a height equal to the first height, such that, the top surface of the layer of silicon nitride is aligned with the top surface of the electro-optically active stack.

The method may comprise depositing silicon nitride on a side wall of the substrate cavity before epitaxially growing the buffer region.

The epitaxially grown electro-optically active stack may have a facet in a region adjacent to a sidewall of the substrate cavity; and the method may comprise the steps of: etching the region to thereby remove the facet and produce a channel between the sidewall and the stack; and filling the channel with a filling material which has a refractive index which is similar to or greater than that of a material forming the sidewall so that the filling material forms a bridge waveguide in the channel between the SOI waveguide and the electro-optically active stack.

The epitaxially grown electro-optically active stack may have a facet in a region adjacent to a sidewall of the substrate cavity; and the method may comprise the steps of: etching the region to thereby remove the facet and produce a channel between the sidewall and the stack; lining the channel with a liner to provide a lined channel; and filling the lined channel with a filling material which has a refractive index which is similar to that of a material forming the sidewall so that the filling material forms a bridge-waveguide in the channel between the SOI waveguide and the electro-optically active stack.

The liner may be formed of silicon nitride. The filling material may be amorphous silicon or silicon-germanium (SiGe).

The step of etching the region to thereby remove the facet and produce the channel between the sidewall and the stack may comprises either: etching through the electro-optically active stack and into the buffer region, such that a base of the channel is formed by a portion of the buffer region; or etching into the electro-optically active stack, such that a base of the channel is formed by a portion of the electro-optically active stack.

The step of etching the region to thereby remove the facet and produce the channel between the sidewall and the stack may comprise etching to a position lower than an interface between the silicon base layer and the BOX layer in the SOI substrate, such that a top surface of the liner at a base of the channel is at the same height as a top surface of the BOX layer.

The method may comprise the steps of: depositing a first electrode contact on a first doped region which forms a bottom layer of the electro-optically active stack; etching an isolation cavity in the first doped region; depositing an insulating material on a side surface of the electro-optically active stack and in the isolation cavity in the first doped region so as to line the isolation cavity, thereby electrically isolating the isolation cavity from the electro-optically active stack; and depositing a second electrode contact on a second doped region which forms a top layer of the electro-optically active stack, the contact extending into the isolation cavity in the first doped region.

The method may comprise the step of etching an amorphous silicon layer from an area above the SOI substrate and proximal to the cavity, followed by the step of performing chemical mechanical planarization on a layer of $SiO_2$ above the electro-optically active stack.

In this application, orientation of the components and layers are discussed in relation to the substrate being the base of the device. The height of a layer or a waveguide is measured in a direction away from the silicon base layer or away from the base of the substrate cavity. A top surface of a layer or a waveguide is the surface that is farthest from the silicon base layer or the base of the substrate cavity and a bottom surface of a layer or waveguide is the surface that is closest to the silicon base layer or the base of the substrate cavity. For example, the height of the SOI layer is measured from a bottom surface of the SOI layer to a top surface of the SOI layer in a direction normal to the interface between the silicon base layer and the BOX layer. The term beneath means closer to the silicon base layer or the base of the substrate cavity. A depth in the substrate cavity refers to the distance from the base of the substrate cavity in the opposite direction as a height. The deeper a layer is within the cavity, the closer it is to the substrate cavity base.

The top of the stack may have a height greater than a height of the SOI layer so that the stack may protrude above the top of the substrate cavity. Such a stack is still considered to be within the cavity as long as a portion of the electro-optically active stack is at the same height above the silicon base layer as the SOI layer. In this way, light from an input waveguide in the SOI layer can enter the electro-optically active stack and light can exit the stack into an output waveguide in the SOI layer.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
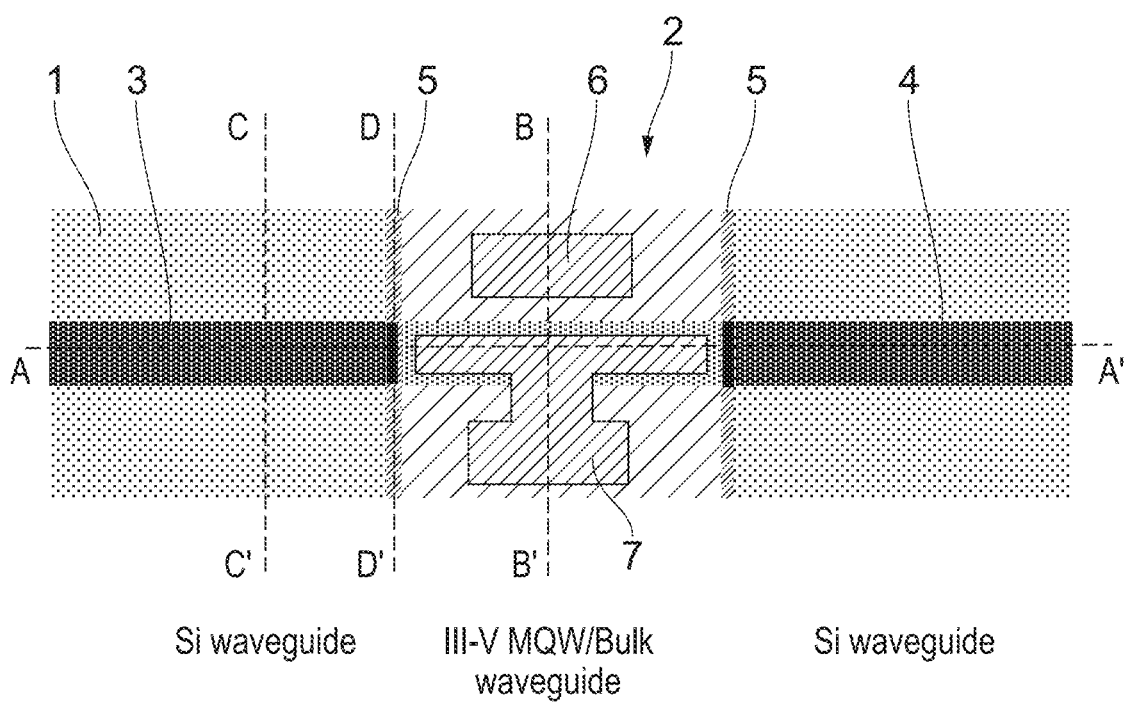
FIG. 1 shows a top view of a monolithic III-V EAM on a Si substrate.

A top view of an III-V MQW/Bulk waveguide EAM 2 on a SOI substrate 1 is shown in FIG. 1. An input SOI waveguide 3 provides a path for light to enter the waveguide of the EAM 2 and an output SOI waveguide 4 provides a path for light to exit the EAM 2. Electrodes 6 and 7 provide connections for electronics which may be used to apply a bias across the electro-optically active stack of the EAM for modulation of light in the EAM. There is an amorphous silicon zone 5 between the input waveguide 3 and the EAM and another amorphous silicon zone 5 between the EAM and the output waveguide 4. The zones 5 form a filling material and can provide a bridge waveguide between the input and output waveguides and the electro-optically active stack. The amorphous silicon zones 5 are surrounded by a liner of $Si_3N_4$. The amorphous silicon may be replaced by SiGe.

Figure 2:
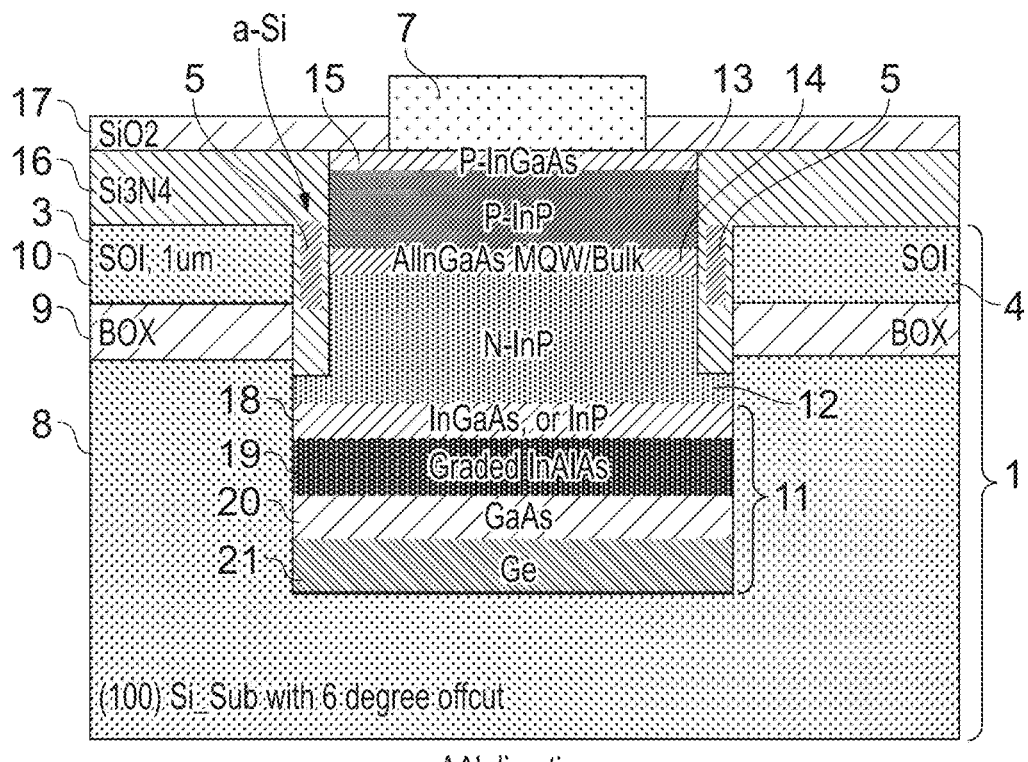
FIG. 2 shows a section view of a version of the EAM of FIG. 1, the EAM being an AlInGaAs MQW or Bulk InGaAsP EAM on a 1 um SOI platform, the section view being along line A-A' of FIG. 1.
Figure 3:
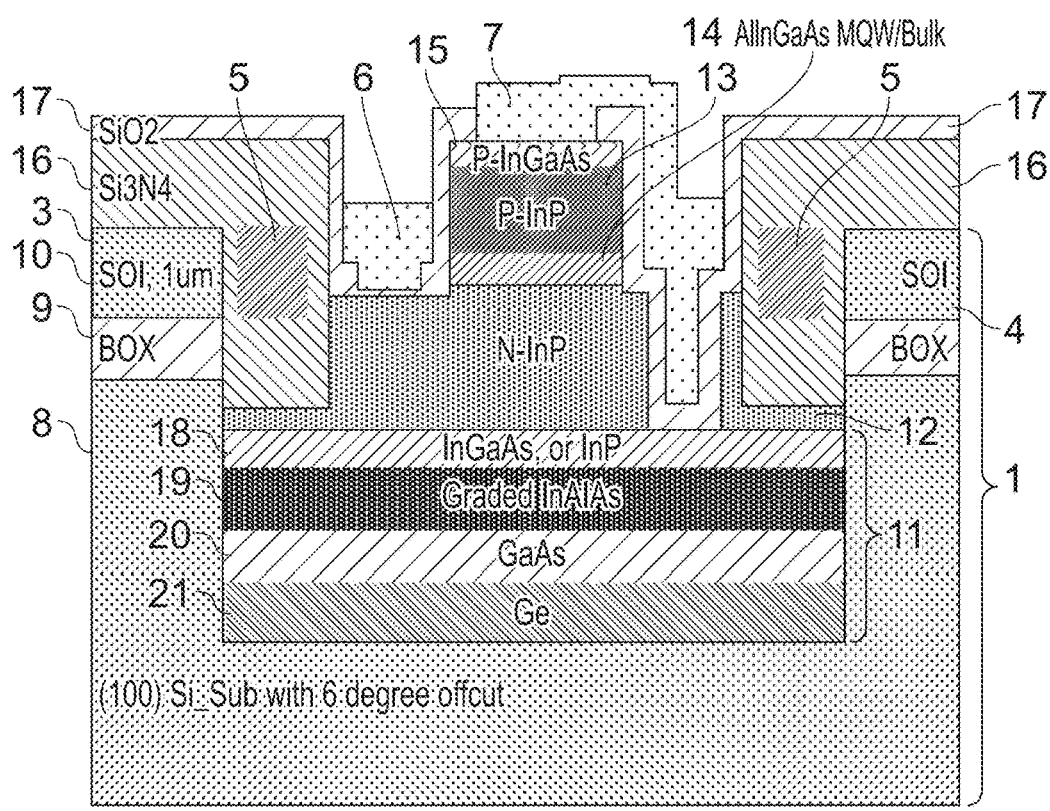
FIG. 3 shows a section view of the EAM of FIG. 2 along line B-B' of FIG. 1.

FIGS. 2 and 3 show an example of the EAM shown in FIG. 1. The EAM is formed on a SOI platform 1 including a silicon base layer 8, a buried oxide layer 9 and a SOI layer 10. The EAM shown in FIG. 2 is on a 1 µm SOI platform where the SOI layer 10 has a height of 1 µm, but in other embodiments, other platform sizes and SOI layer heights may be used. The silicon base layer may be a (100) silicon substrate with 6 degree offcut.

A substrate cavity extends through the SOI layer 10, through the BOX layer 9 and into the silicon base layer 8. The base of the cavity is formed in the silicon base layer 8.

An electro-optically active stack is formed within the substrate cavity. In this example, the stack is formed of a layer of N doped InP 12, a layer of AlInGaAs 14, a layer of P doped InP and a layer of P doped InGaAs 15. The layer of AlInGaAs 14 may be a multiple quantum well layer or a bulk layer. The top of the stack has a height greater than a height of the SOI layer 10 so that the stack protrudes above the top of the substrate cavity. Other layers may be added to the stack, one or more layers may be omitted from the stack and/or other layers may replace one or more layers in the stack. The layers may be reordered.

The P doped layer and the N doped layer surround the layer of intrinsic or uid AlInGaAs 14, thereby forming a vertical PIN junction in the stack. A bias may be applied across the PIN junction to create a modulation region.

The EAM also has a buffer region 11 beneath the electro-optically active waveguide. The buffer region 11 in this example consists of a layer of Ge 21, a layer of GaAs 20, a layer of Graded InAlAs 19 and a layer of InGaAs or InP 18. The layer of InGaAs or InP 18 is on top of the layer of Graded InAlAs 19, the layer of Graded InAlAs 19 is on top of the layer of GaAs 20 and the layer of GaAs 20 is on top of the layer of Ge 21. Other layers may be added to the buffer region, one or more layers may be omitted from the buffer region and/or other layers may replace one or more layers in the buffer region. The layers may be reordered.

The buffer region 11 is on the base of the substrate cavity. The electro-optically active stack is on the buffer region 11.

The N doped InP layer 12 is on top of the buffer region 11, the layer of AlInGaAs 14 is on top of the N doped InP layer 12, the layer of P doped InP is on top of the layer of AlInGaAs 14 and the layer of P doped InGaAs 15 is on top of the layer of P doped InP. In other embodiments, the layers may be reversed so that the P doped layer(s) are positioned lower (closer to the base of the substrate cavity) than the layer of AlInGaAs 14 and the N doped layer(s) are positioned higher than the layer of AlInGaAs 14. In other embodiments, other doped and undoped or unintentionally doped layers may form the electro-optically active stack.

Electrode 6 contacts a lower doped layer of the electro-optically active stack and electrode 7 contacts an upper doped layer of the electro-optically active stack. Thus, in the embodiment of FIGS. 2 and 3, electrode 6 contacts the layer of N doped InP 12 of the electro-optically active stack and electrode 7 contacts the layer of P doped InGaAs 15 of the electro-optically active stack. In other embodiments, electrode 6 may contact a P doped layer and electrode 7 may contact an N doped layer.

There is a layer of $Si_3N_4$ 16 on top of the SOI layer 10 and a layer of $SiO_2$ 17 on top of the $Si_3N_4$ layer 16. The amorphous silicon zones 5 are between the input waveguide 3 and the electro-optically active stack and between the electro-optically active stack and the output waveguide 4. The amorphous silicon zones 5 are surrounded by a liner of $Si_3N_4$. $Si_3N_4$ is a silicon-rich silicon nitride with a refractive index of 2.7.

Table 1 shows an example of layer heights and compositions for this embodiment for a MQW EAM utilising the QCSE. Extra layers of GaAsN and GaAs are included between the AlGaAs layer and the InGaNAs layer. Extra layers of GaAsN and GaAs are also included between the InGaNAs layer and the AlGaAs layer.

Another example of the heights and compositions of layers used in this embodiment are shown in Table 2 for an EAM with a bulk III-V material utilising the FK effect. Use of the FK effect has an advantage over the use of QCSE as the FK effect is polarisation independent. The layer of InGaAsP in Table 2 may be replaced with AlInGaAs as shown in FIGS. 2 and 3 or InGaNAs. The example has an extra layer of InGaAsP between the layer of P doped InP and the layer of P doped InGaAs.

Figure 4:
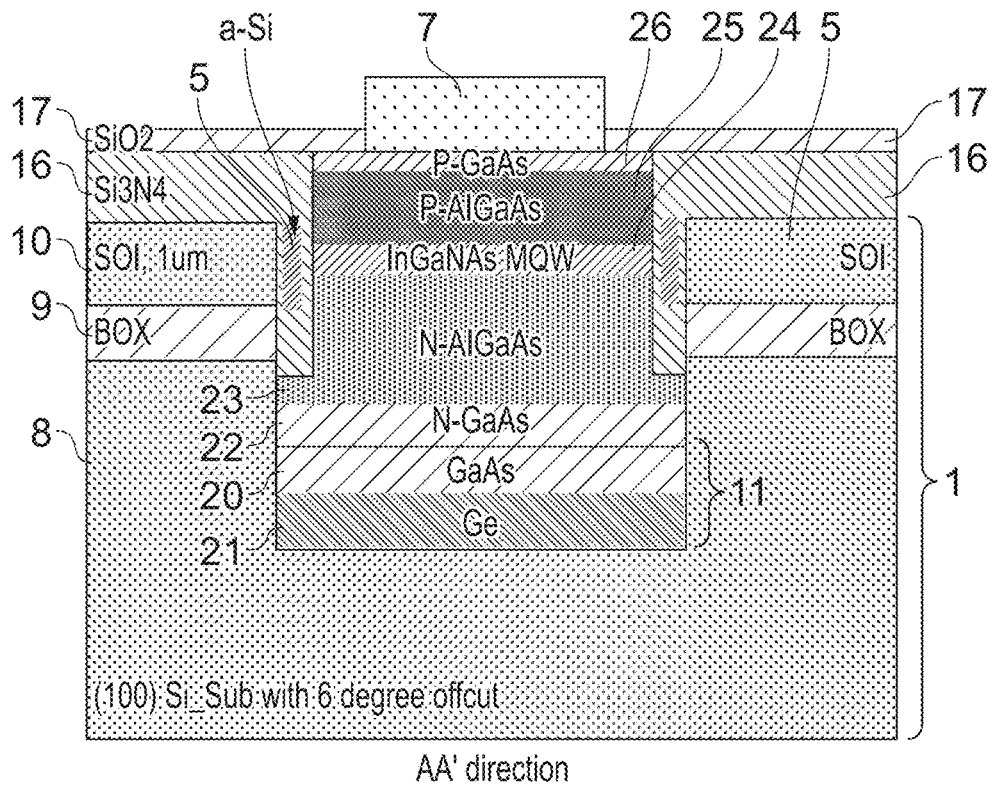
FIG. 4 shows a section view of a version of the EAM of FIG. 1, the EAM being an InGaNAs MQW EAM on a 1 um SOI platform, the section view being along line A-A' of FIG. 1.
Figure 5:
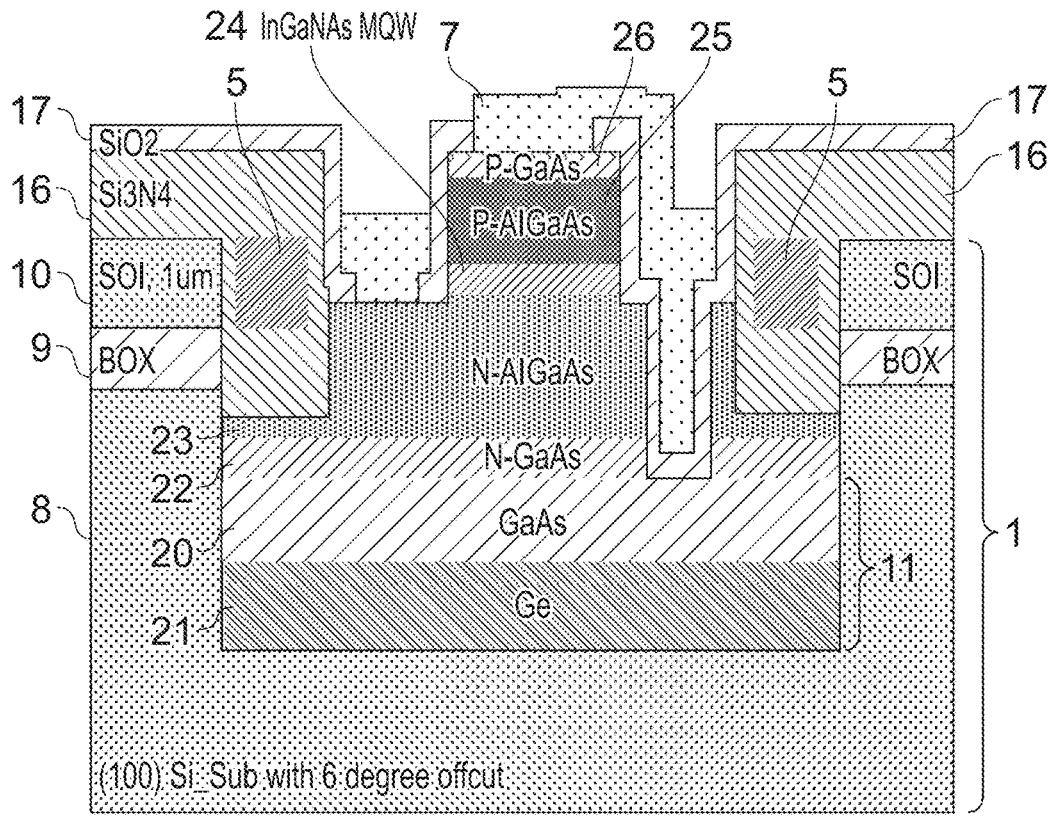
FIG. 5 shows a section view of an InGaNAs MQW EAM on a 1 um SOI platform along line B-B' of FIG. 1.

Another embodiment is shown in FIGS. 4 and 5 along lines A-A' and B-B' respectively of FIG. 1. This embodiment is the same as the embodiment shown in FIGS. 2 and 3 except for the composition of the buffer region 11 and the composition of the electro-optically active stack.

The electro-optically active stack is formed of a layer of N doped GaAs 22, a layer of N doped AlGaAs 23, a layer of InGaNAs 24, a layer of P doped AlGaAs 25 and a layer of P doped GaAs 26. The layer of P doped GaAs 26 is on top of the layer of P doped AlGaAs 25, the layer of P doped AlGaAs 25 is on top of the layer of InGaNAs 24 and the layer of InGaNAs 24 is on top of the layer of N doped AlGaAs 23. Other layers may be added to the stack, one or more layers may be omitted from the stack and/or other layers may replace one or more layers in the stack. The layers may be reordered. The InGaNAs layer 24 may have a MQW structure.

The P doped layer and the N doped layer surround the layer of intrinsic or uid InGaNAs 24, thereby forming a vertical PIN junction in the stack. A bias may be applied across the PIN junction to create a modulation region.

The electro-optically active stack is on top of the buffer region 11.

The buffer region 11 is formed of a layer of Ge 21 and a layer of GaAs 20. The layer of Ge 21 is on the base of the substrate cavity and the layer of GaAs 20 is on the layer of Ge. Other layers may be added to the buffer region, one or more layers may be omitted from the buffer region and/or other layers may replace one or more layers in the buffer region. The layers may be reordered.

Table 3 shows an example of heights of layers in this embodiment for a MQW EAM utilising the QCSE. As shown by this example, the layers discussed in this application may be made up of sub-layers which may differ in their dopant content. For example, in Table 3, the layer of InP is formed of three sub-layers (layers 6, 7, 8) each having a different level of silicon doping. Further, as illustrated by this example, extra layers may be included in the stack and/or in the buffer region. In the example of Table 3, an extra layer of InGaAsP is also included between each of the InP layers and the AlInGaAs layer. A layer of InGaAsP is also added between the P doped InP layer and the P doped InGaAs layer. The column n/u/p describes the doping of the layer. A marking of uid in the table means the layer may be unintentionally doped and whilst no dopant is actively applied to the layer, there may be some residual doping due to the thinness of the layer and layers adjacent being doped.

Figure 6:
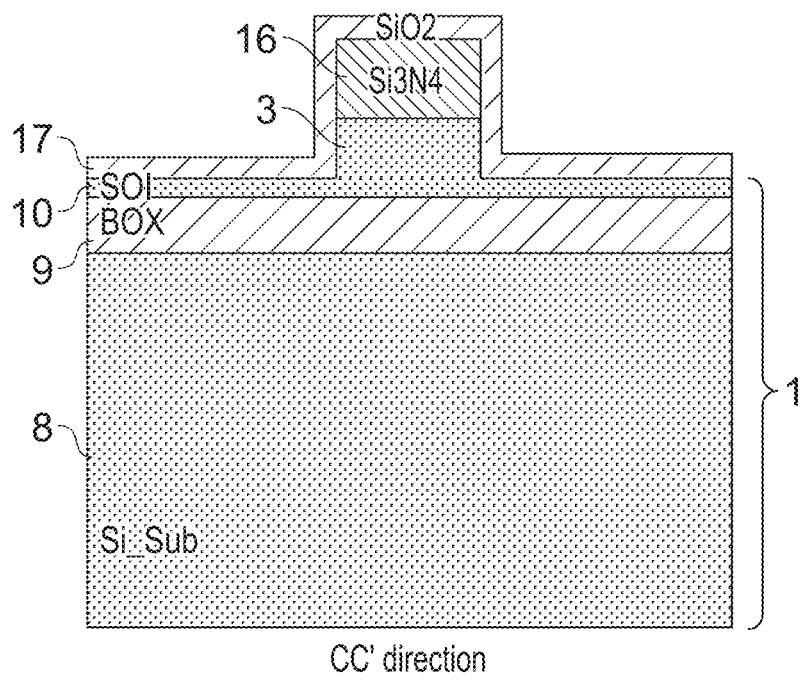
FIG. 6 shows a section view of the EAM of FIG. 1 along line C-C' of FIG. 1.

FIG. 6 shows a section view through line C-C' of FIG. 1 and shows the input waveguide 3. The waveguide is a rib waveguide formed in the SOI layer 10. A layer of $Si_3N_4$ 16 is on top of the ridge of the rib waveguide. A layer of $SiO_2$ is formed over the waveguide and the layer of $Si_3N_4$.

Figure 7:
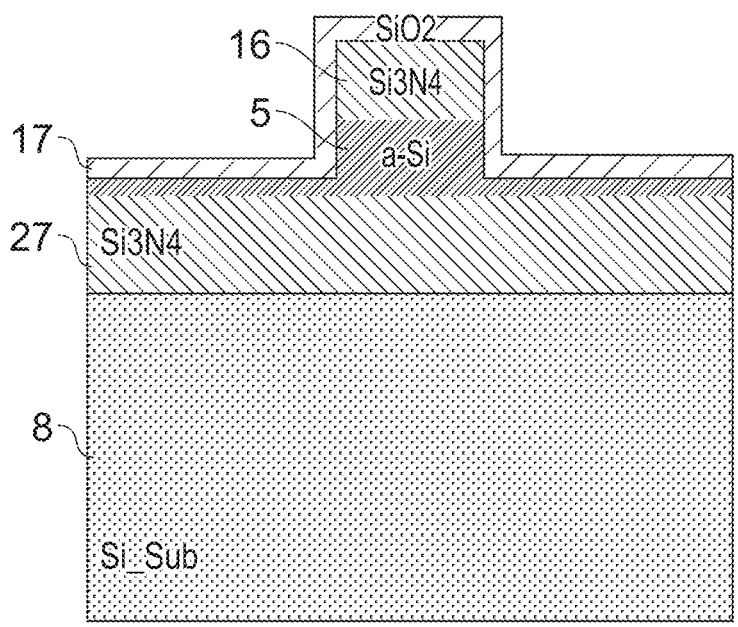
FIG. 7 shows a section view of the EAM of FIG. 1 along line D-D' of FIG. 1.

FIG. 7 shows a section view through line D-D' of FIG. 1 and shows the amorphous silicon zones 5. In this region of the device, a layer of $Si_3N_4$ 27 is on top of the silicon base layer 8, a layer of amorphous silicon 5 is on top of the layer of $Si_3N_4$ 27 and a rib waveguide is formed in the amorphous silicon 5, the rib waveguide of amorphous silicon being aligned with the electro-optically active stack and the input waveguide. A layer of $Si_3N_4$ 16 is on top of the ridge of the rib waveguide. A layer of $SiO_2$ is formed over the waveguide and the layer of $Si_3N_4$.

The same structure as shown in FIG. 7 is provided between the electro-optically active stack and the output waveguide, with the rib waveguide of amorphous silicon being aligned with the electro-optically active stack and the output waveguide.

The device shown in FIGS. 2 and 3 may be formed as described below with reference to FIGS. 8A to 8V. An analogous method may be used to form the embodiment shown in FIGS. 4 and 5 by substituting the appropriate layers in the buffer region and stack.

A layer of $Si_3N_4$ 16 is deposited on a SOI substrate. The top surface of the layer of $Si_3N_4$ 16 may have a height above the silicon base layer 8 that matches the desired height of the top surface of the electro-optically active stack when it is deposited in the substrate cavity.

Figure 8A:
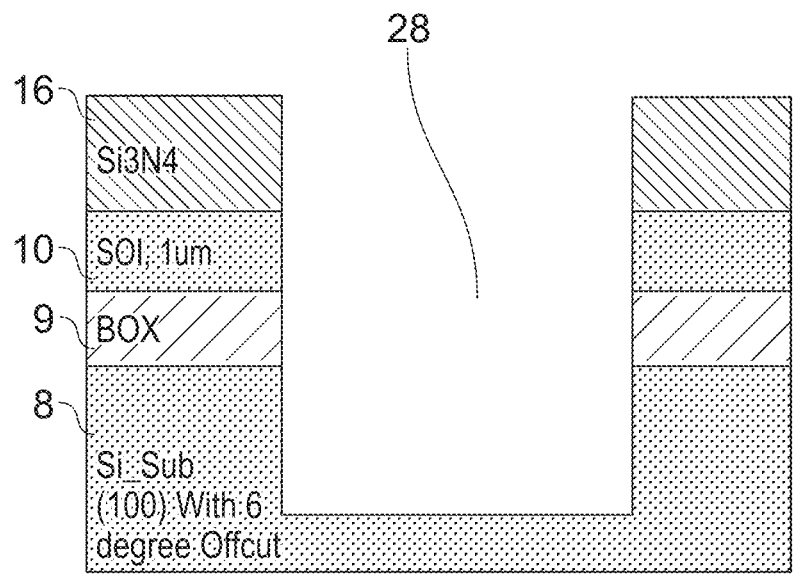
FIGS. 8A to 8V show steps in a method of manufacture of an EAM.

A substrate cavity 28 is etched in the substrate as shown in FIG. 8A. The cavity extends through the layer of $Si_3N_4$ 16, through the SOI layer 10, through the BOX layer 9 and into the silicon base layer 8. The distance the cavity extends to in the silicon base layer may be chosen such that the center mode of a silicon waveguide in the SOI layer aligns with the center mode of the electro-optically active stack to be deposited.

Figure 8B:
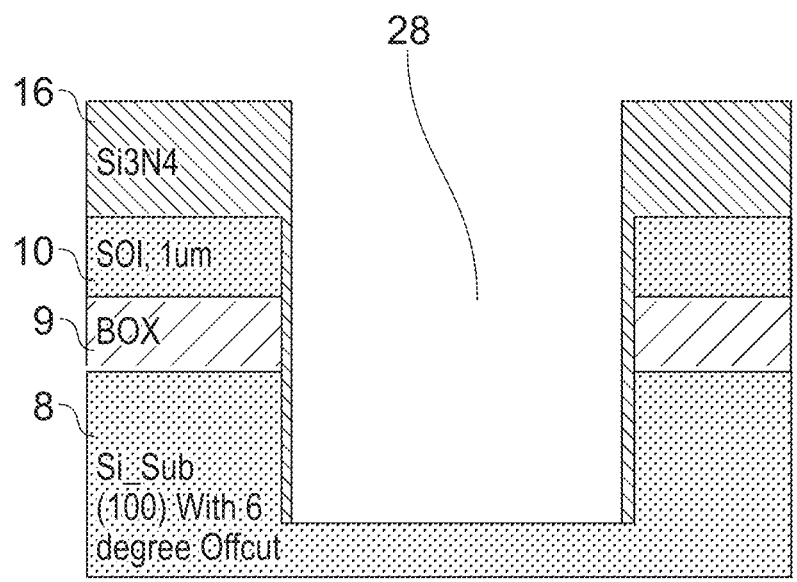

Then, 20 nm of $Si_3N_4$ is deposited on the sidewalls of the substrate cavity as shown in FIG. 8B. This may be achieved by non-isotropic etching.

Figure 8C:
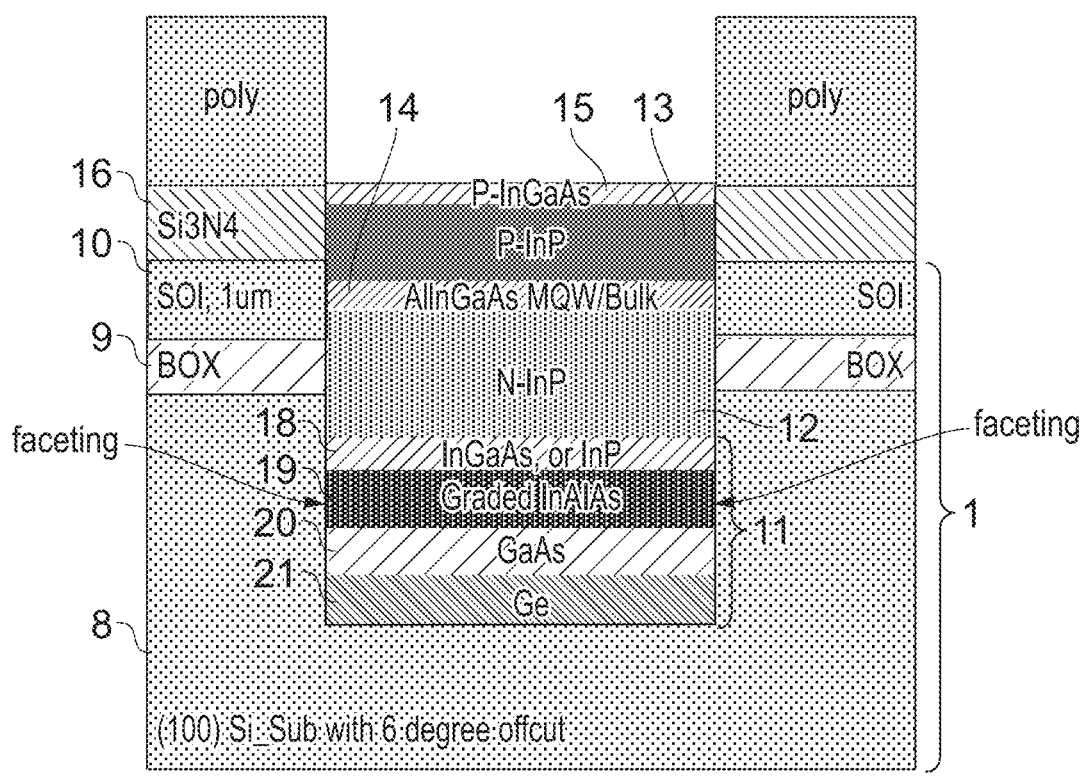

Poly crystalline III-V (poly) is deposited on the $Si_3N_4$ layer 16 and the buffer region and the electro-optically active stack are grown by epitaxial growth on the base of the substrate cavity. The layers forming the buffer region and the stack have faceting at the edges of the cavity as shown in FIG. 8C.

Figure 8D:
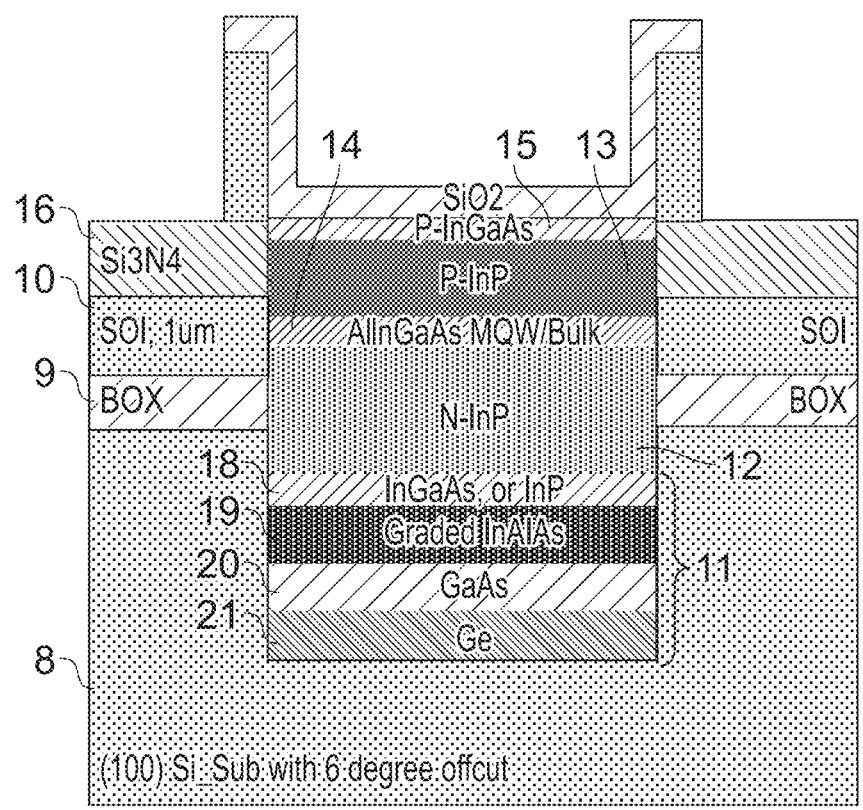
Figure 8E:
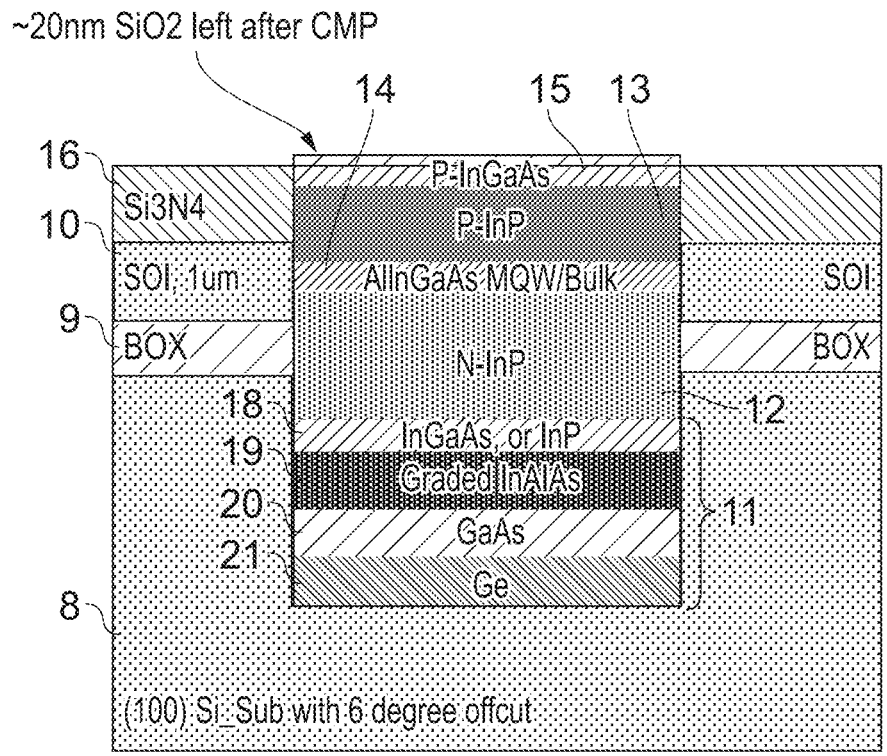

A layer of $SiO_2$ is deposited on the device on the electro-optically active stack and the poly. Etching is performed on an area surrounding the substrate cavity, leaving the layer of $SiO_2$ on the stack and poly and $SiO_2$ between the area that was etched and the substrate cavity as shown in FIG. 8D. Chemical mechanical polishing (CMP) is then used to remove the remaining poly, leaving around 20 nm $SiO_2$ on the top surface of the stack as shown in FIG. 8E.

Figure 8F:
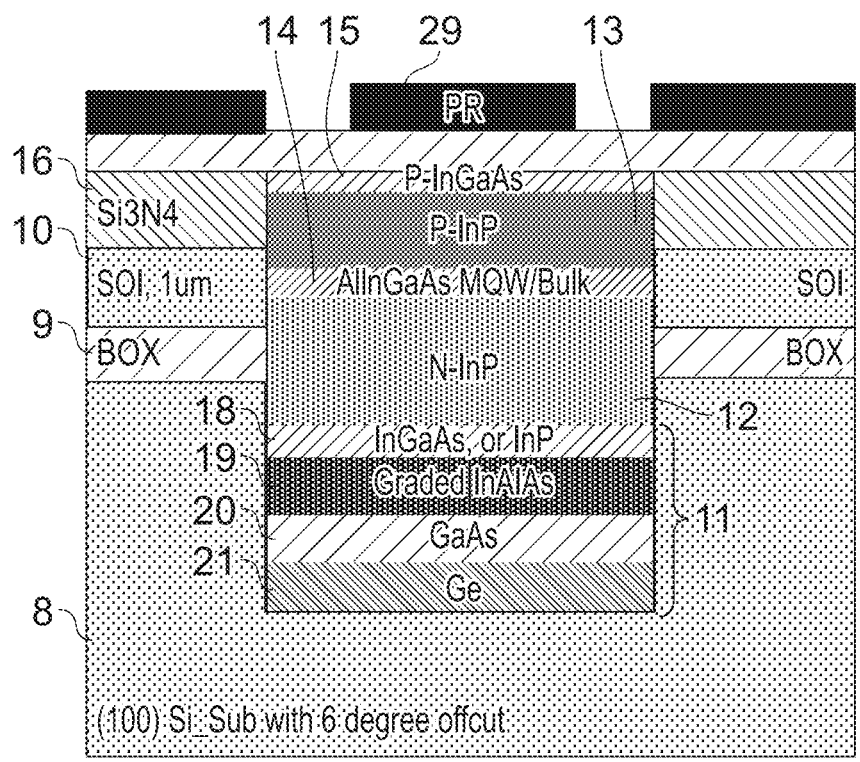
Figure 8G:
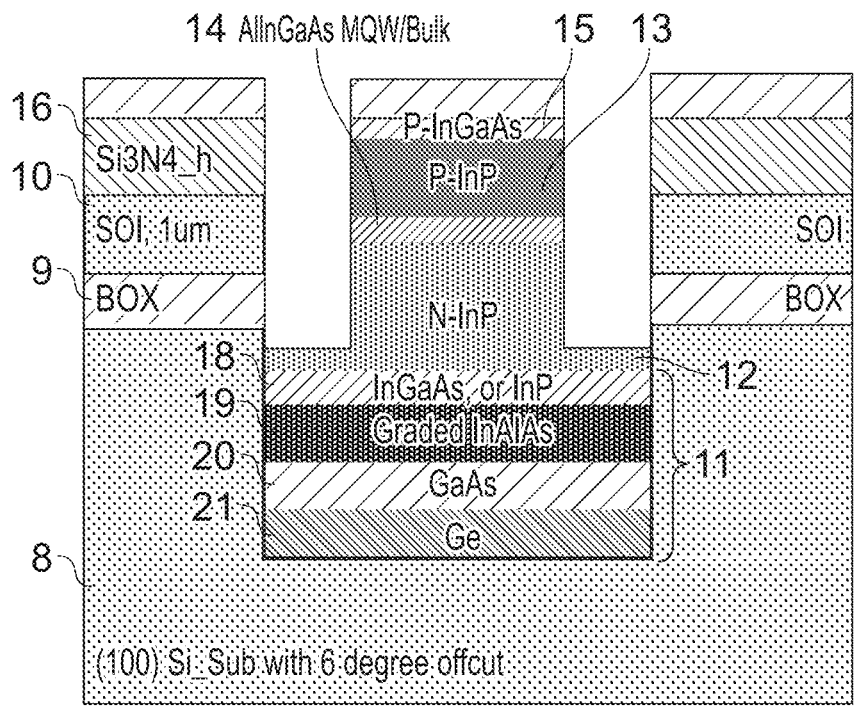

$SiO_2$ is then deposited on the device as a hard mask and patterned using photo resist 29 in preparation for etching the faceted region of the stack at the edges of the cavity as shown in FIG. 8F. The hard mask of $SiO_2$ is then used to etch the faceted edges of the stack to make channels and remove defects from the faceted edge regions. As is shown in FIG. 8G, the etch removes the faceted edges of the layer of P doped InGaAs 15, the layer of P doped InP 13 and the layer of AlInGaAs 14. The etch also removes an upper portion of the faceted edges of the layer of N doped InP 12. The etch forms two channels, one at the edge of the substrate cavity adjacent the input waveguide and one at the edge of the substrate cavity adjacent the output waveguide.

Figure 8H:
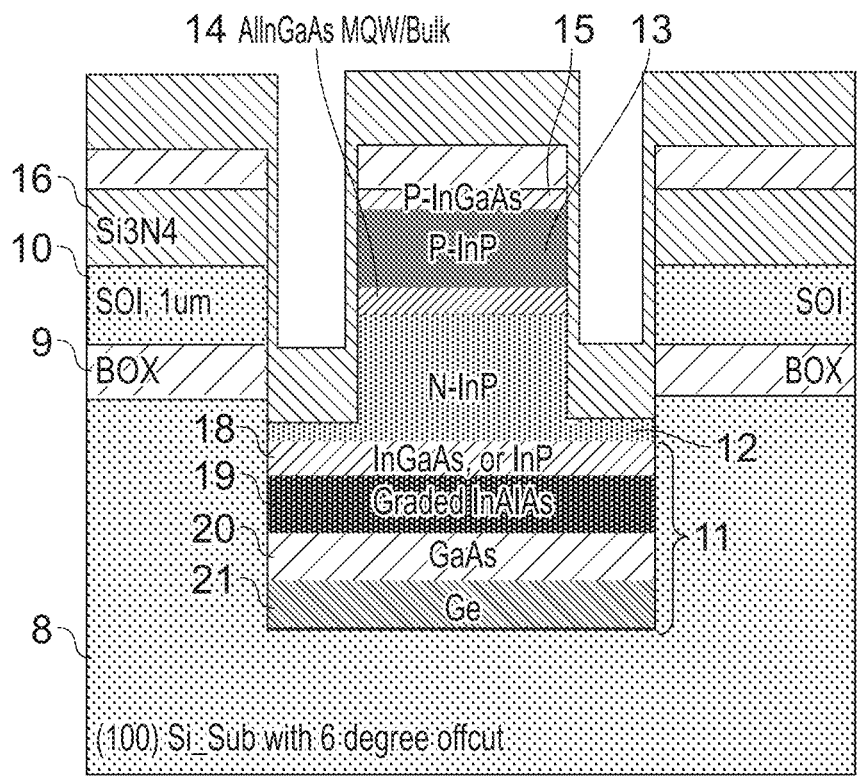

Silicon-rich $Si_3N_4\_h$ is then deposited on the device as shown in FIG. 8H. The $Si_3N_4\_h$ forms a layer 30 on the $SiO_2$ layer and forms a layer in the base of each of the channels at the edges of the substrate cavity. The $Si_3N_4\_h$ is also deposited on the sidewalls of the channels with a thickness at the side walls of between 230 nm and 260 nm. The $Si_3N_4\_h$ has a refractive index of 2.7.

Figure 8I:
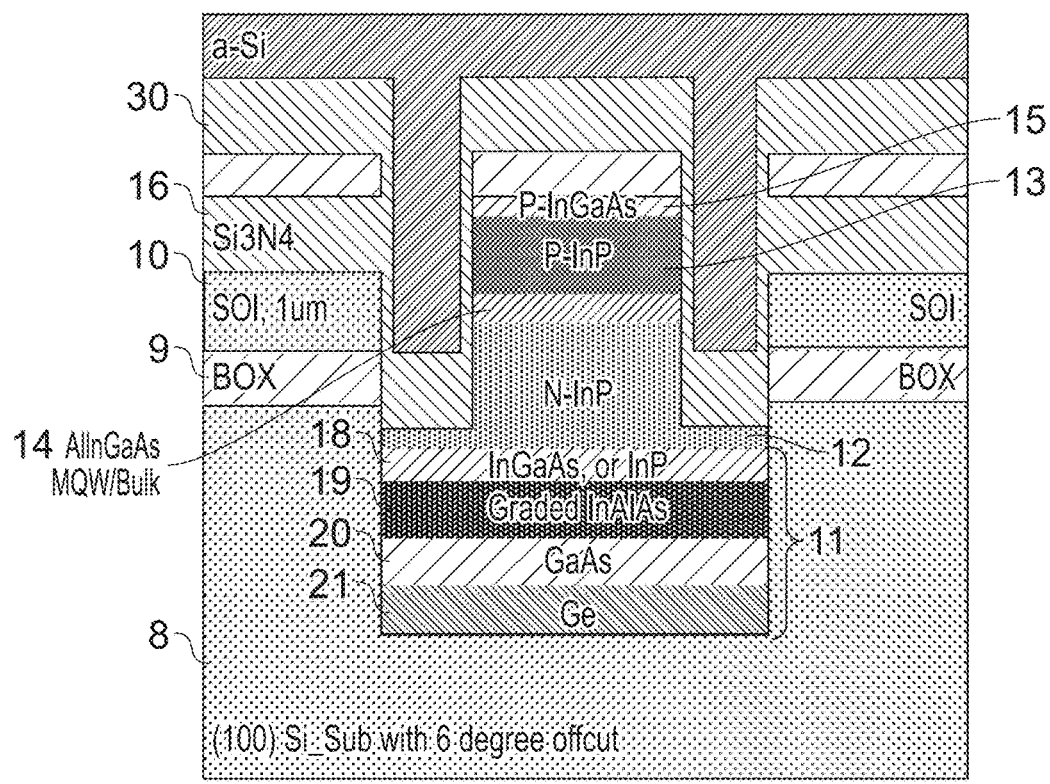
Figure 8J:
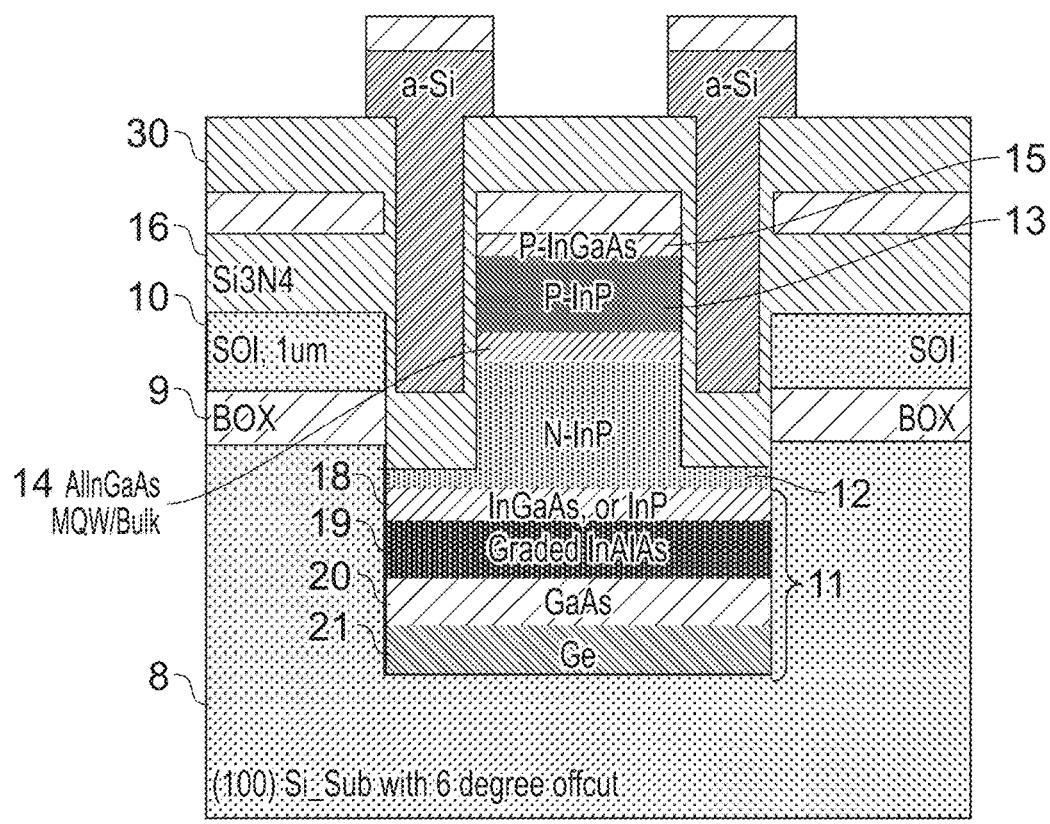

Amorphous silicon is then deposited to fill the channels and form a layer on the $Si_3N_4\_h$ as shown in FIG. 8I. $SiO_2$ is then deposited on amorphous silicon in the area above the channels and the amorphous silicon is then etched from the area surrounding the channels, leaving the amorphous silicon in and above the channels.

Figure 8K:
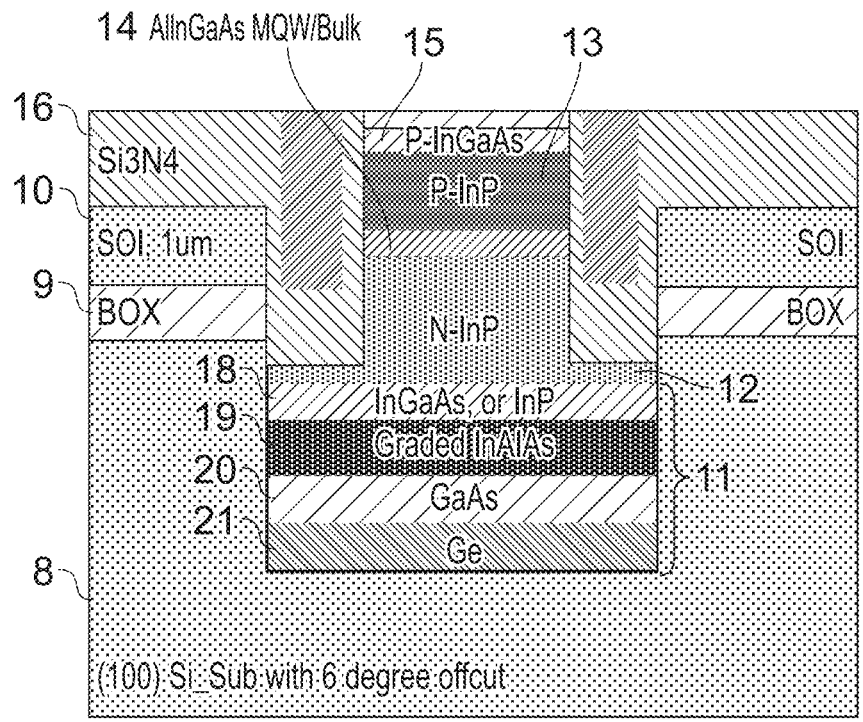

CMP is then used to remove the $SiO_2$, reduce the height of the remaining amorphous silicon, remove the $Si_3N_4\_h$ layer 30 and reduce the height of the $SiO_2$ layer on the stack to around 100 nm as shown in FIG. 8K.

Figure 8L:
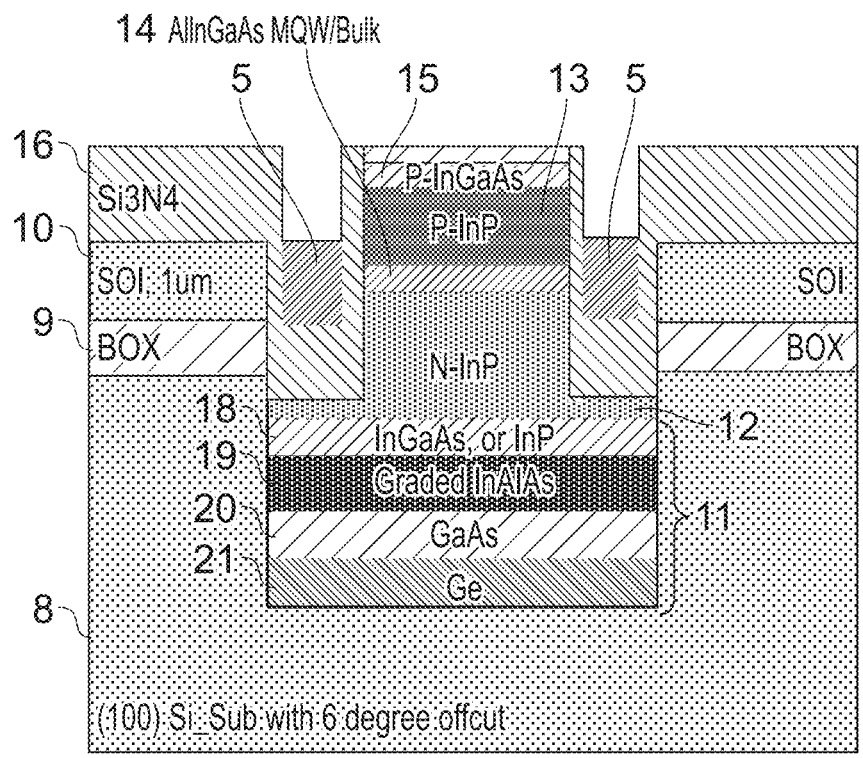
Figure 8M:
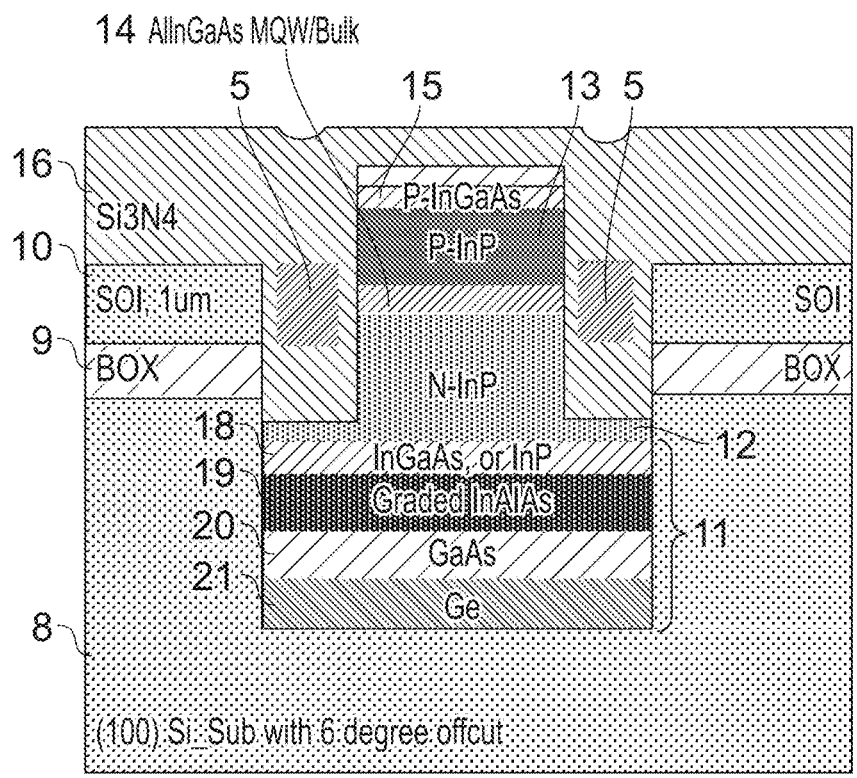
Figure 8N:
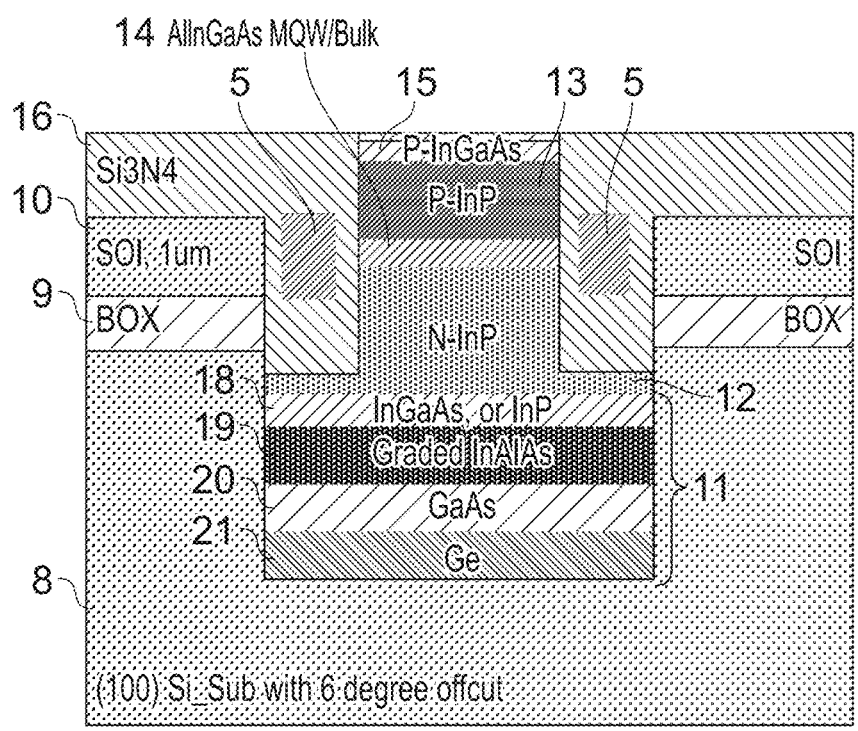

The amorphous silicon is then etched so that the top surface of the amorphous silicon has the same height as the top surface of the SOI layer 10 (see FIG. 8L). $Si_3N_4$ is then deposited and polished using CMP to the height of the $SiO_2$ layer on the stack as shown in FIGS. 8M and 8N.

Figure 8O:
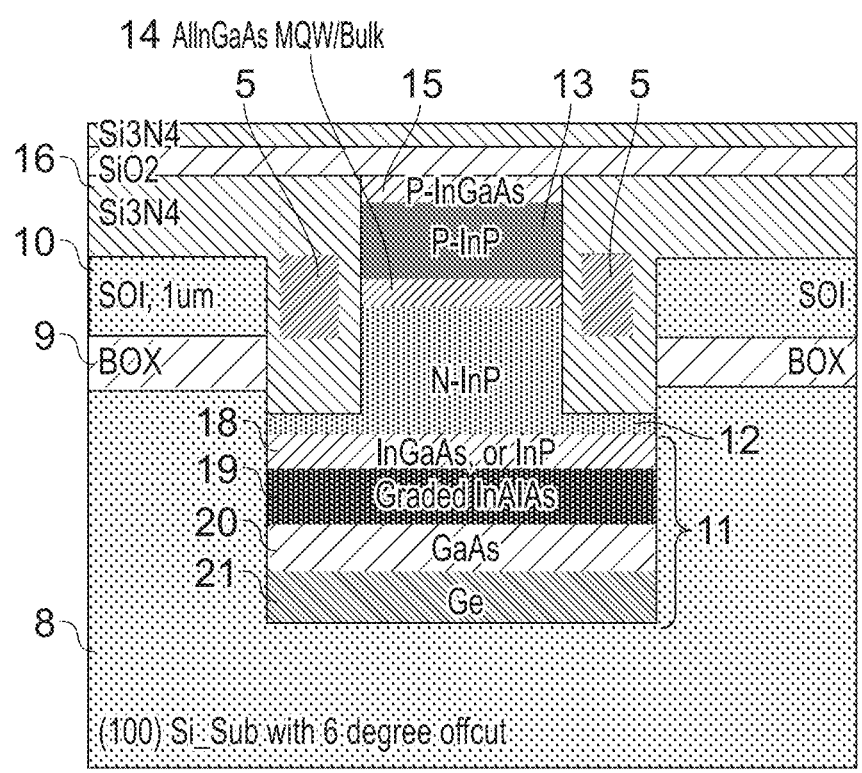
Figure 8P:
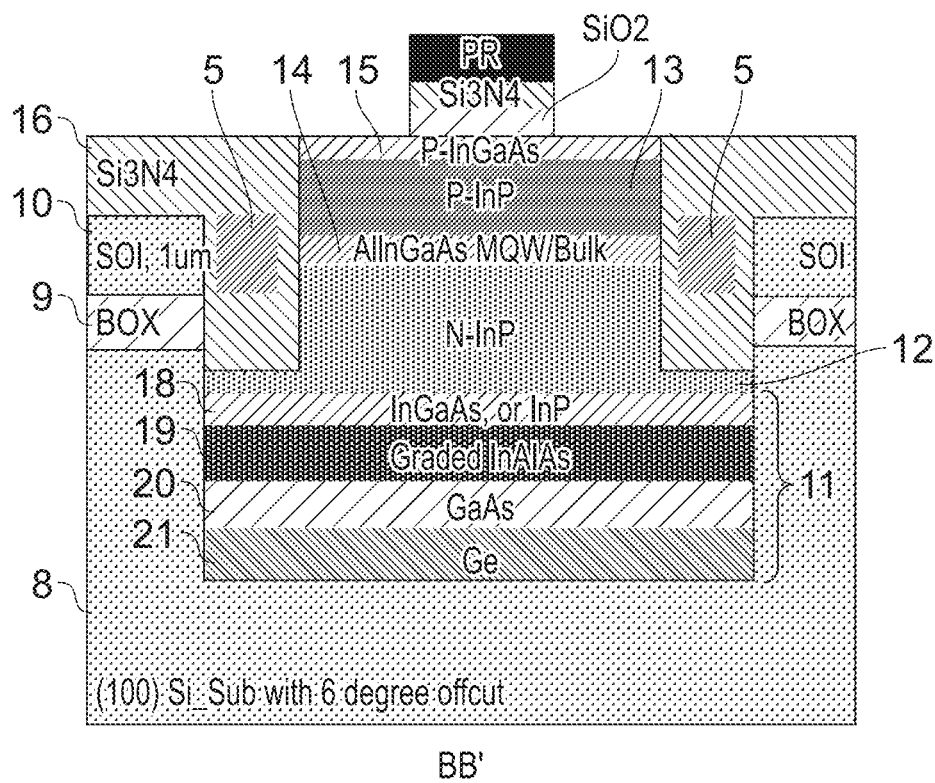
Figure 8P:
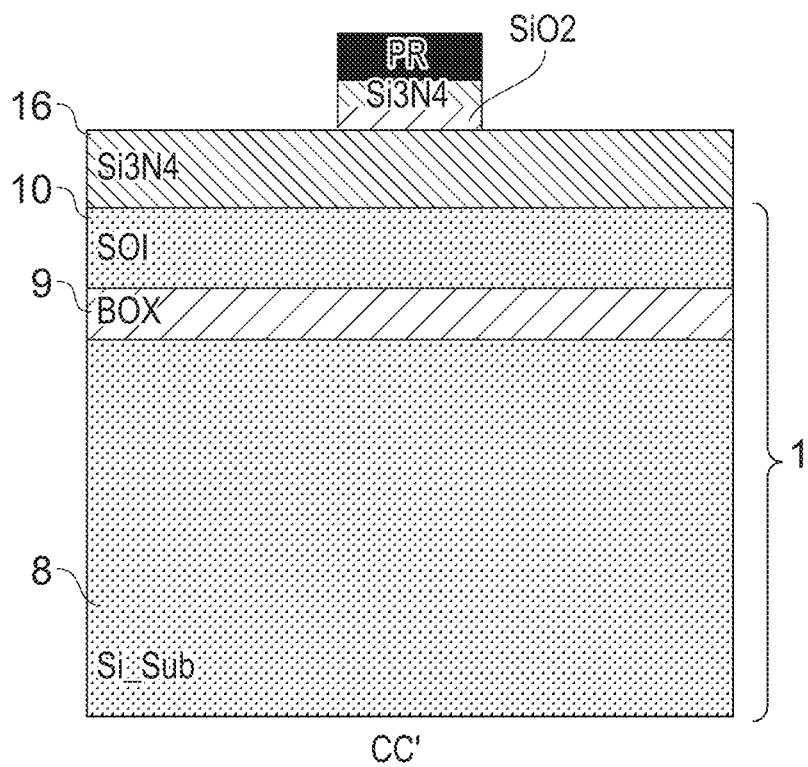

$SiO_2$ and $Si_3N_4$ hard masks are then deposited for making a waveguide in the stack (FIG. 8O). Then, photo resist is used to pattern the masks to give the desired waveguide shape as shown in FIG. 8P which includes section views in directions B-B' and C-C' as depicted in FIG. 1.

Figure 8Q:
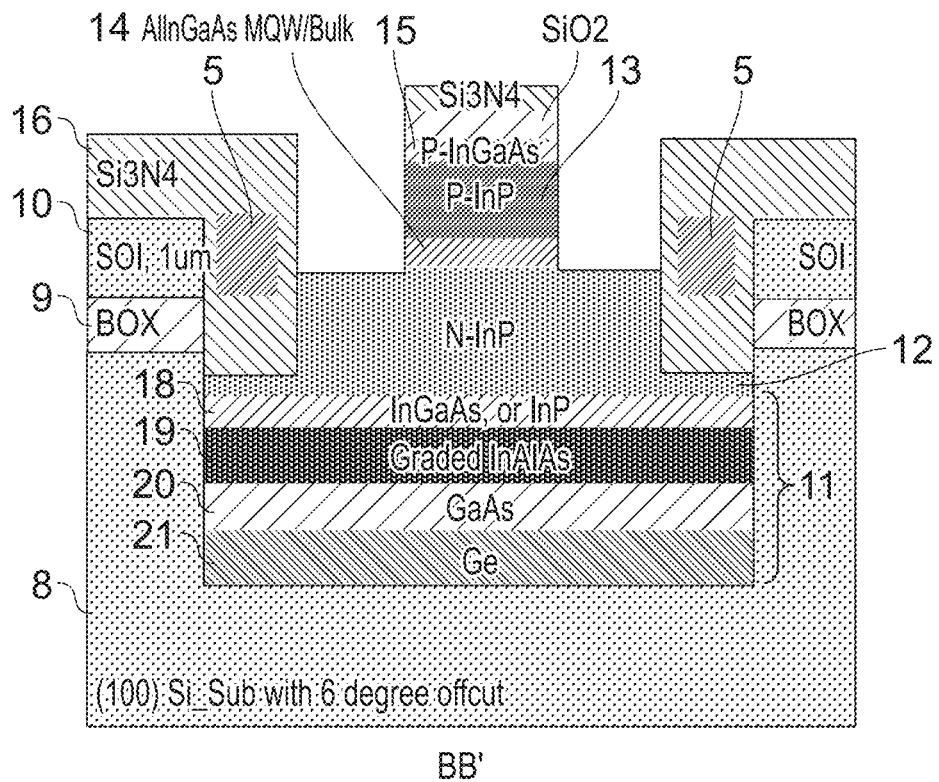
Figure 8Q:
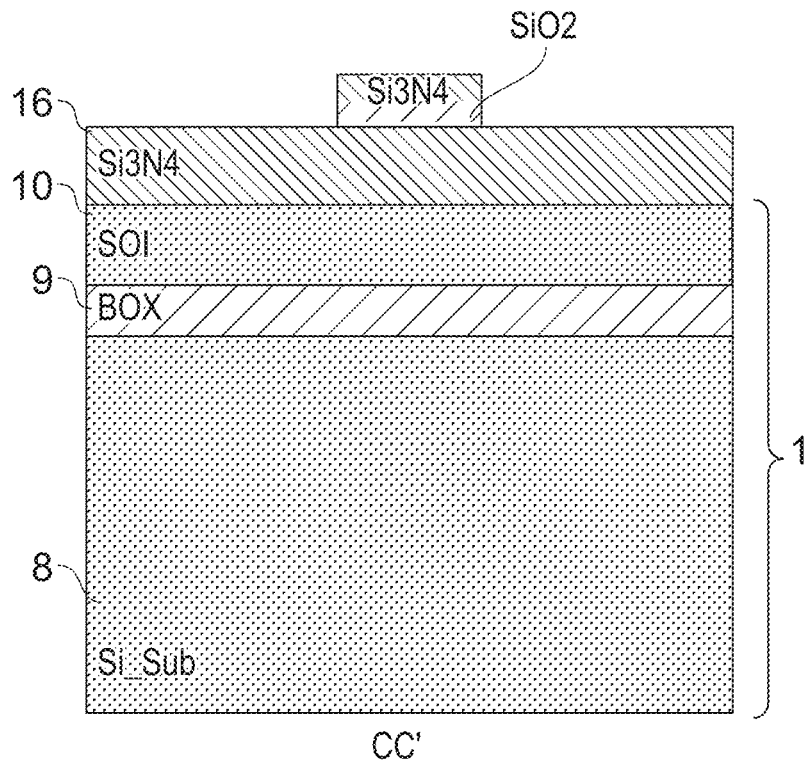

A rib waveguide is formed in the stack as shown in FIG. 8Q by etching trenches through the layer of P doped InGaAs 15, the layer of P doped InP 13 and the layer of AlInGaAs 14. The trenches also extend into an upper portion of the layer of N doped InP 12. The ridge of the rib waveguide is formed by the stack between the etched trenches. The $Si_3N_4$ layer is not etched in this step.

Figure 8R:
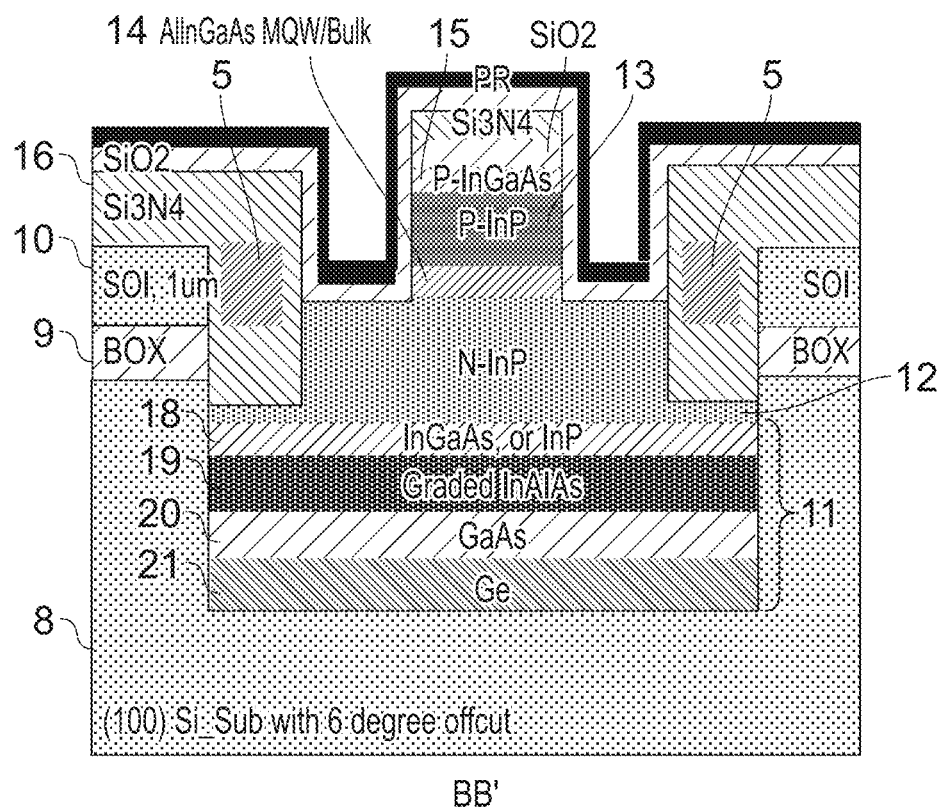
Figure 8R:
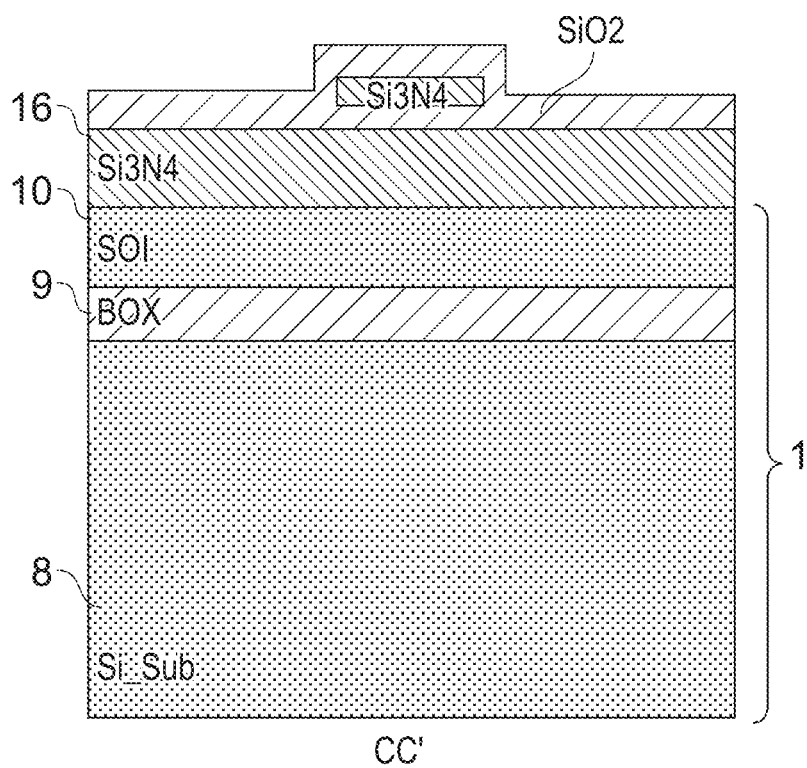
Figure 8S:
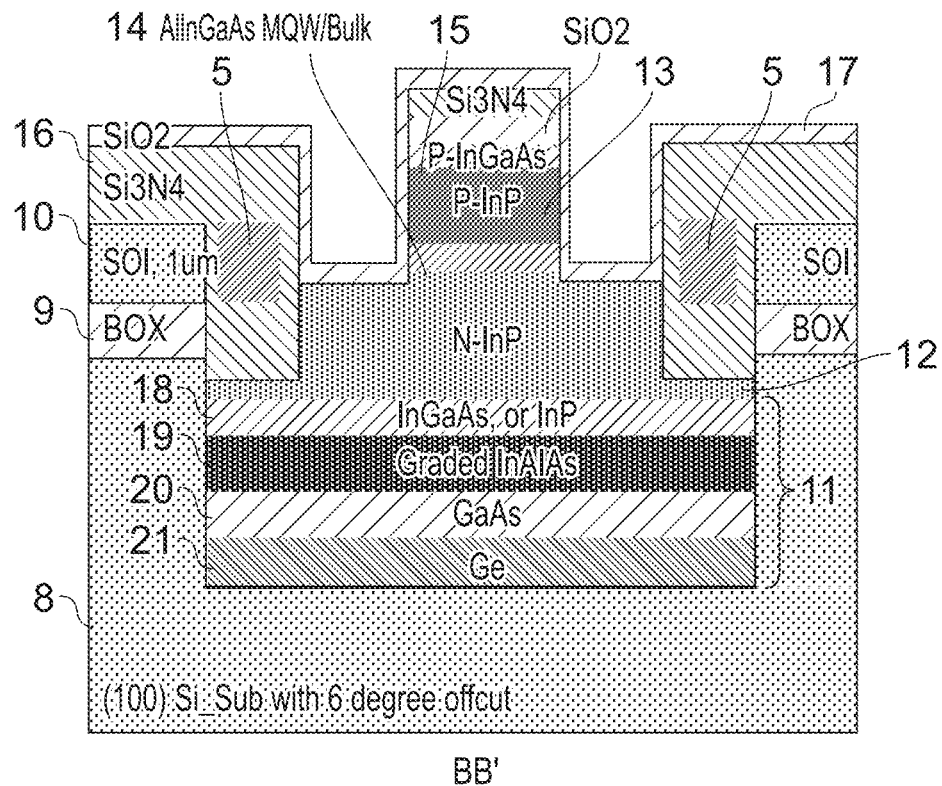
Figure 8S:
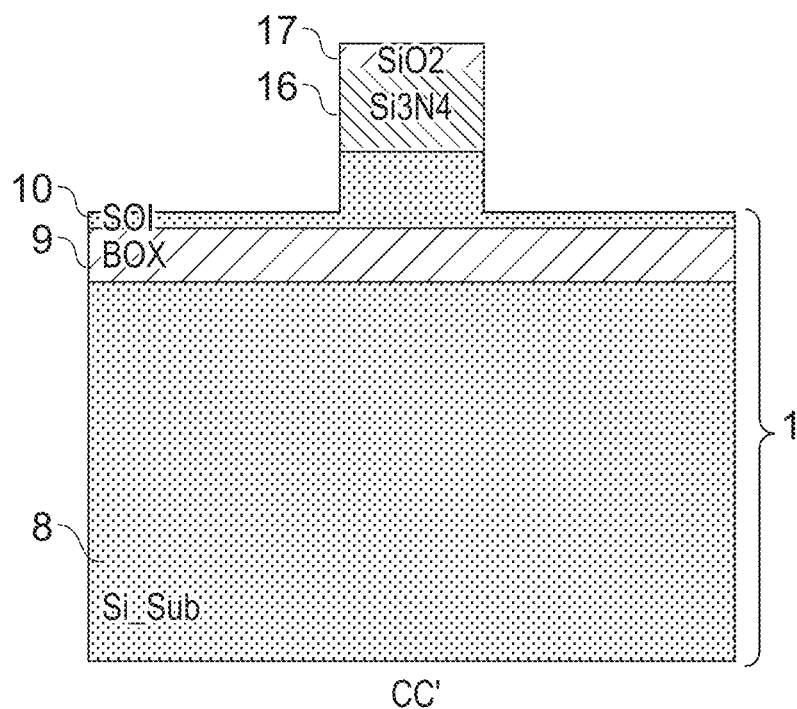

A layer of $SiO_2$ is then deposited on the device and photoresist is added to the region above the electro-optically active stack as can be seen in FIG. 8R. The $SiO_2$ layer on the input and output waveguide regions is then etched away to expose the $Si_3N_4$ hard mask. Then the $SiO_2$ hard mask is used to further etch the $Si_3N_4$ and SOI to form a rib waveguide in each of the input and output waveguide regions as shown in FIG. 8S.

Figure 8T:
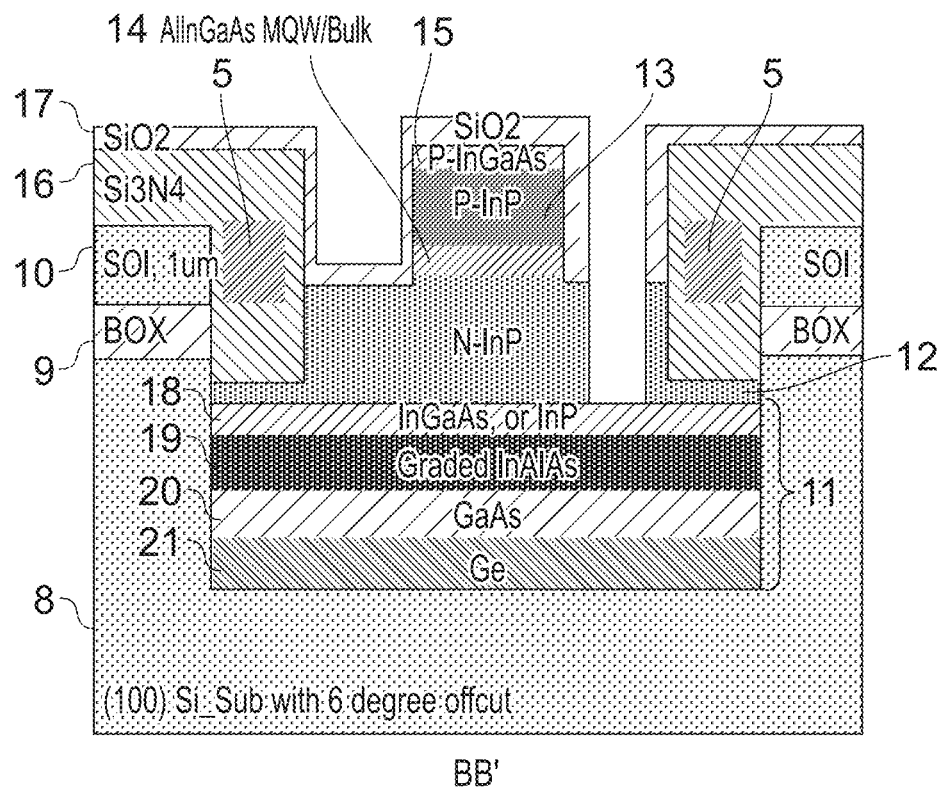
Figure 8T:
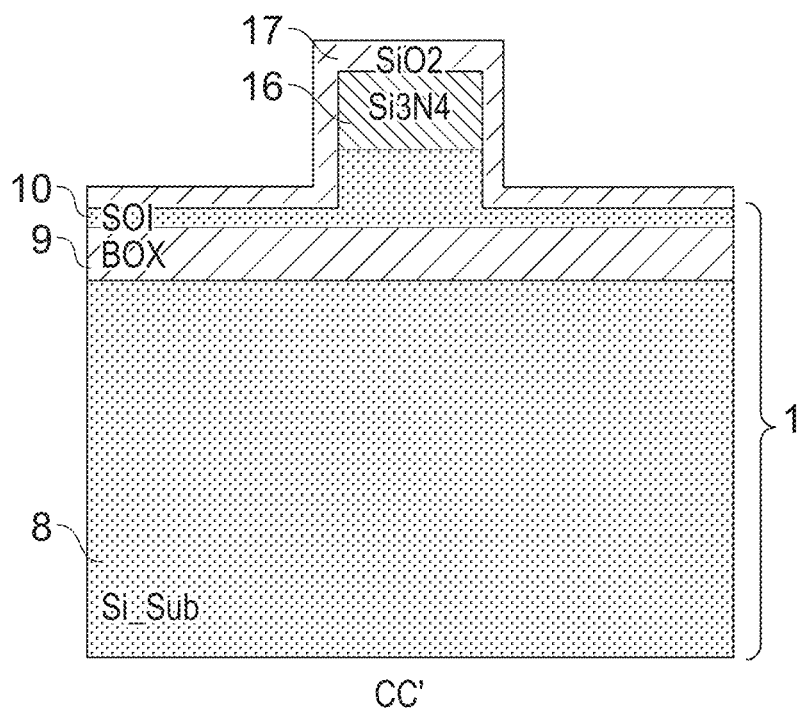
Figure 8U:
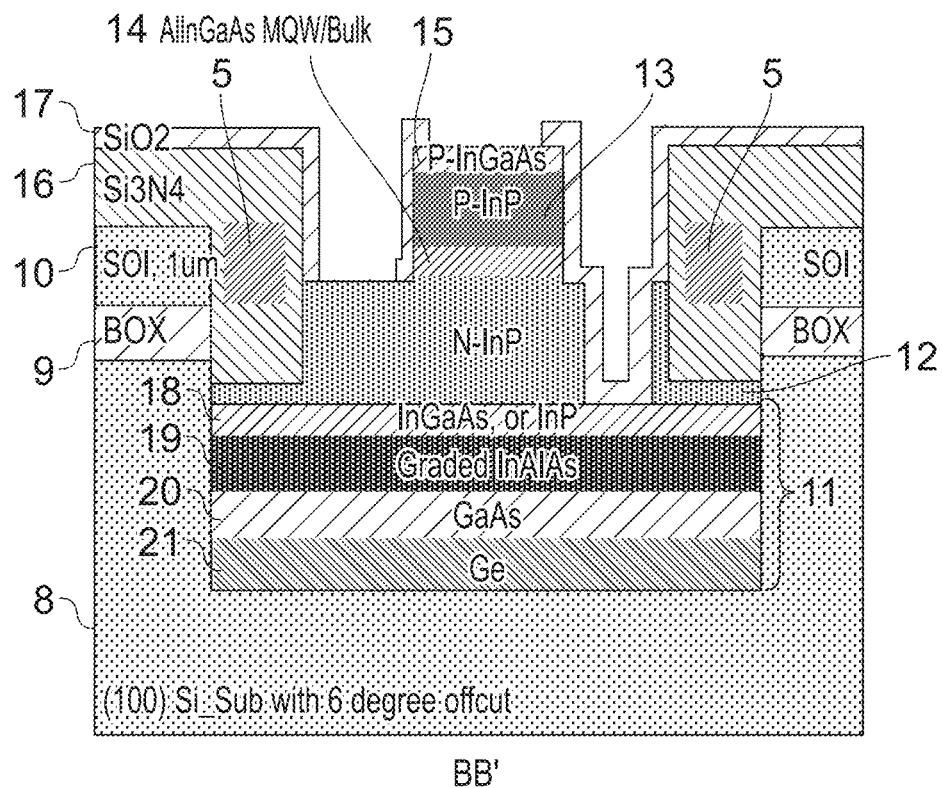
Figure 8U:
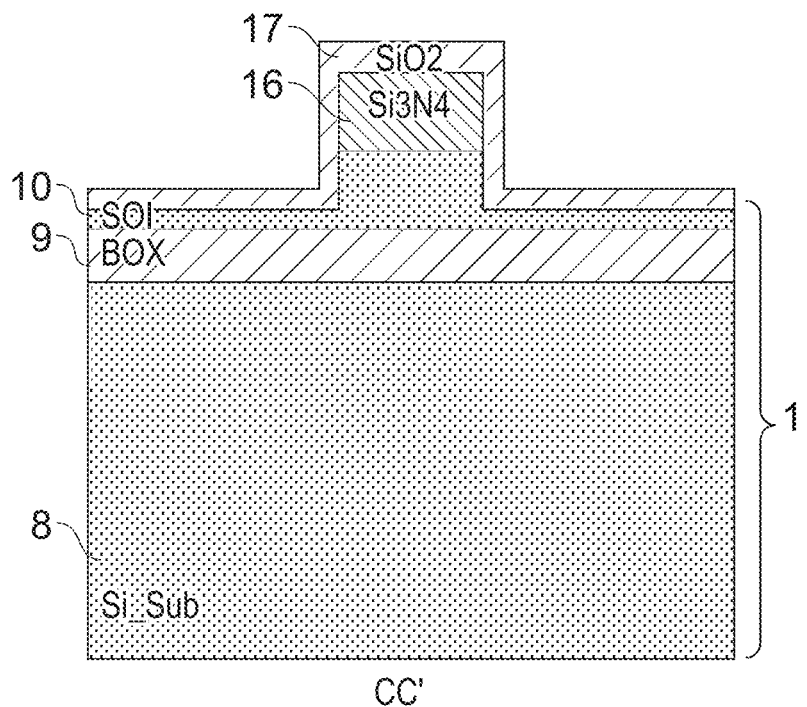

FIG. 8T shows an isolation cavity etched through the N doped InP layer to the InGaAs or InP layer so that the top electrode can be better isolated from the lower, N doped region to reduce parasitic capacitance. The isolation cavity is lined with an insulator such as $SiO_2$. In FIG. 8U, the insulator lining is deposited in the trench and contact points are opened on each of the lower (N doped) and the upper (P doped) layers of the electro-optically active stack, by removing portions of the $SiO_2$ layer at these locations.

Figure 8V:
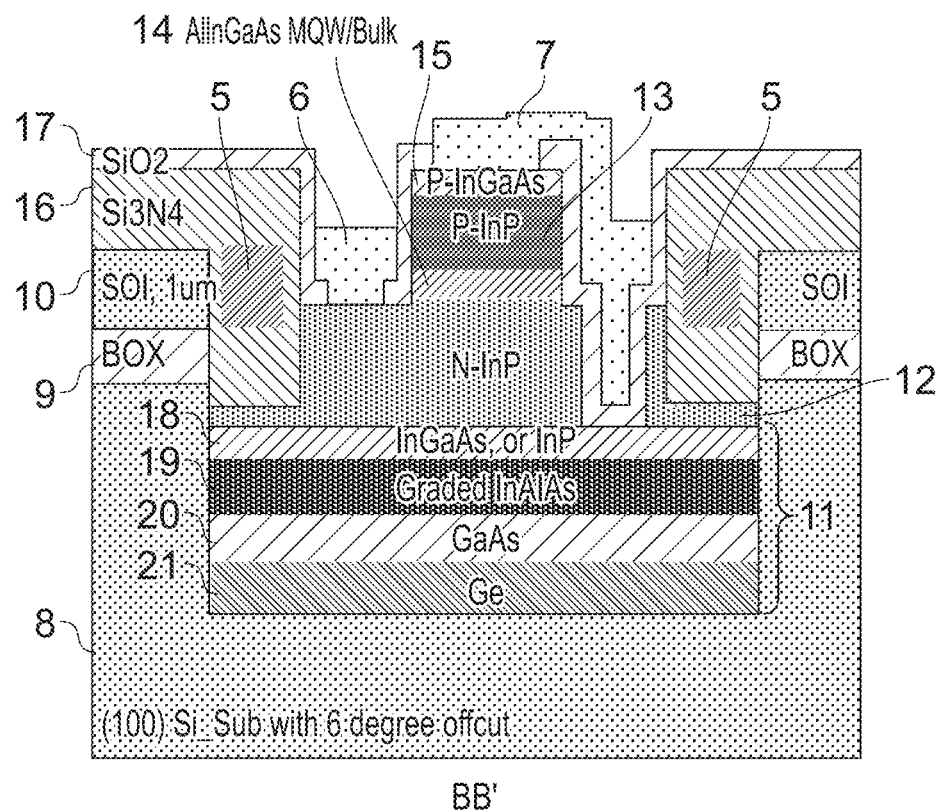
Figure 8V:
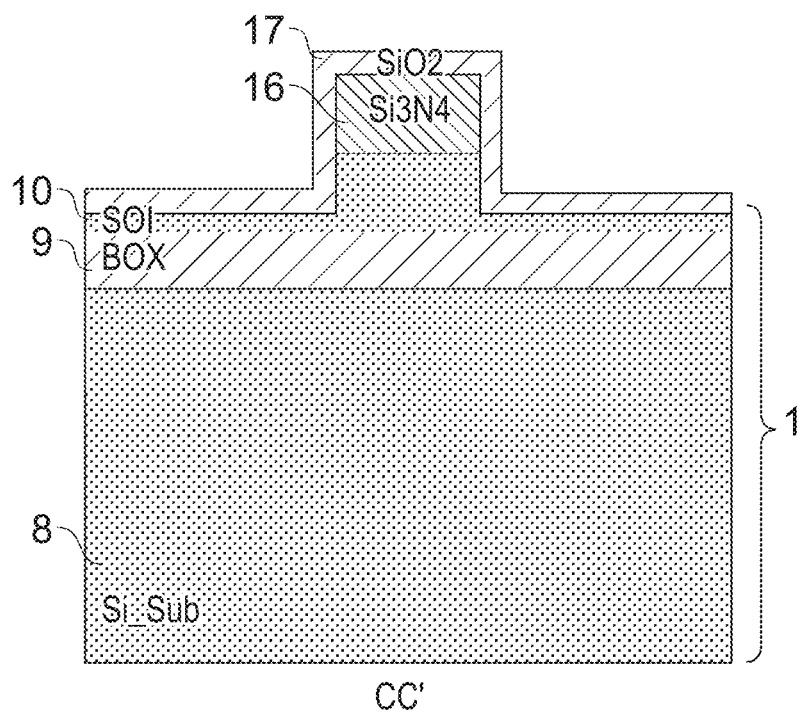

Metallization is then used to form electrodes 6 and 7 at the contact points as shown in FIG. 8V.

Figure 9A:
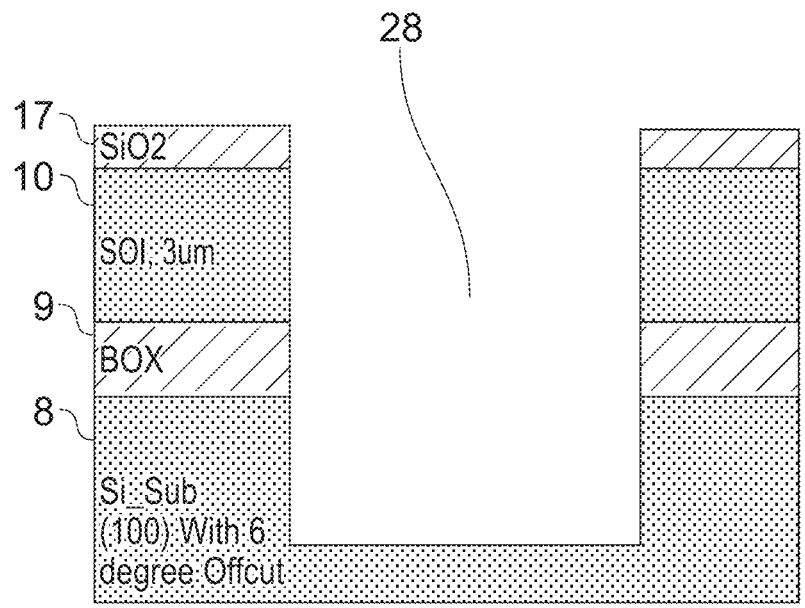
FIGS. 9A to 9U show steps in a method of manufacture of an EAM.
Figure 9B:
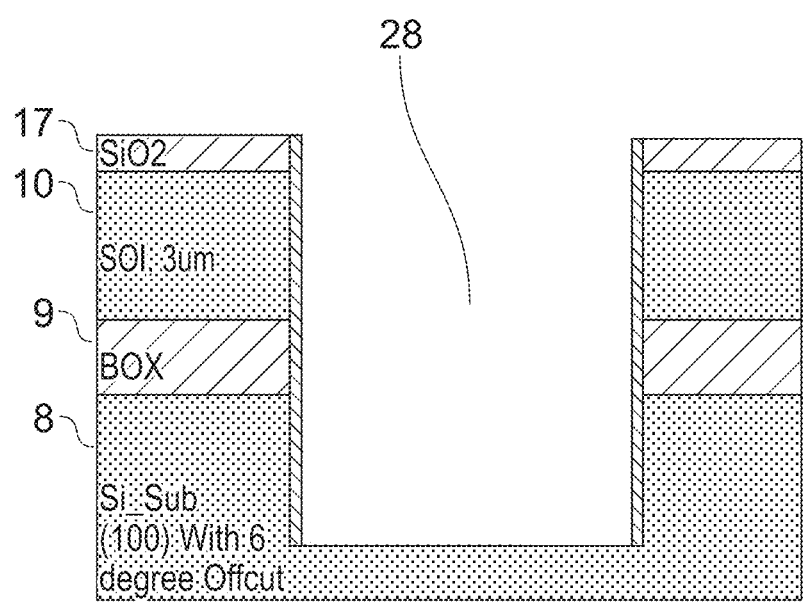
Figure 9C:
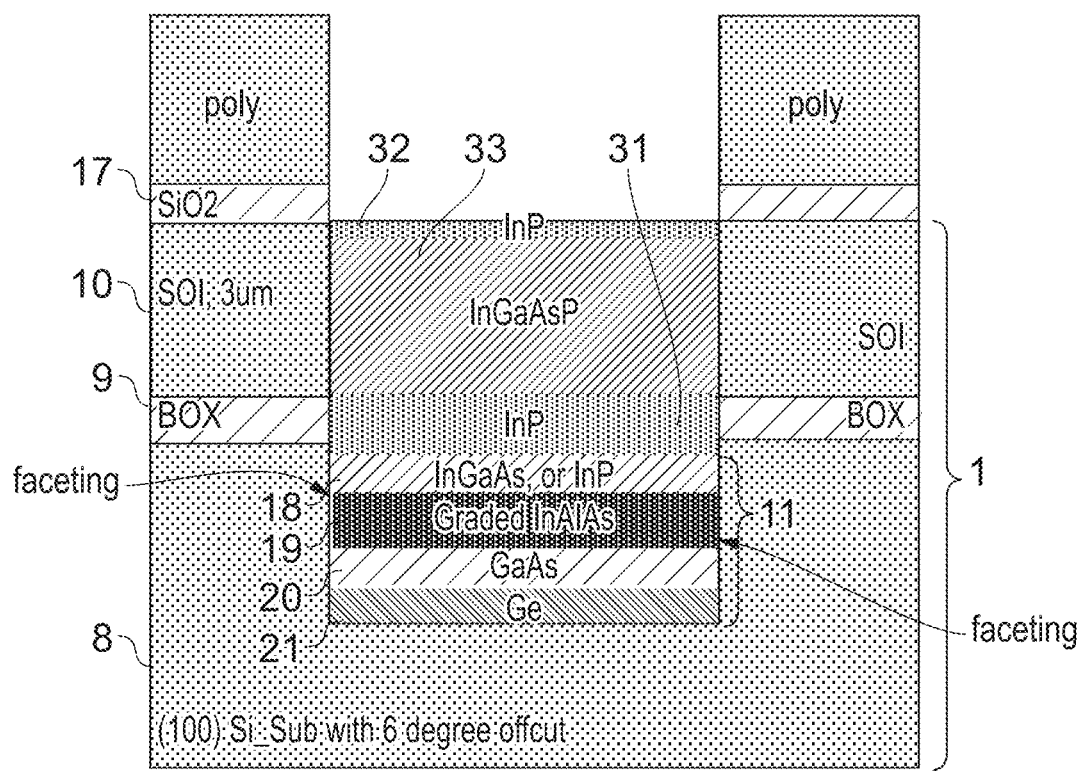
Figure 9D:
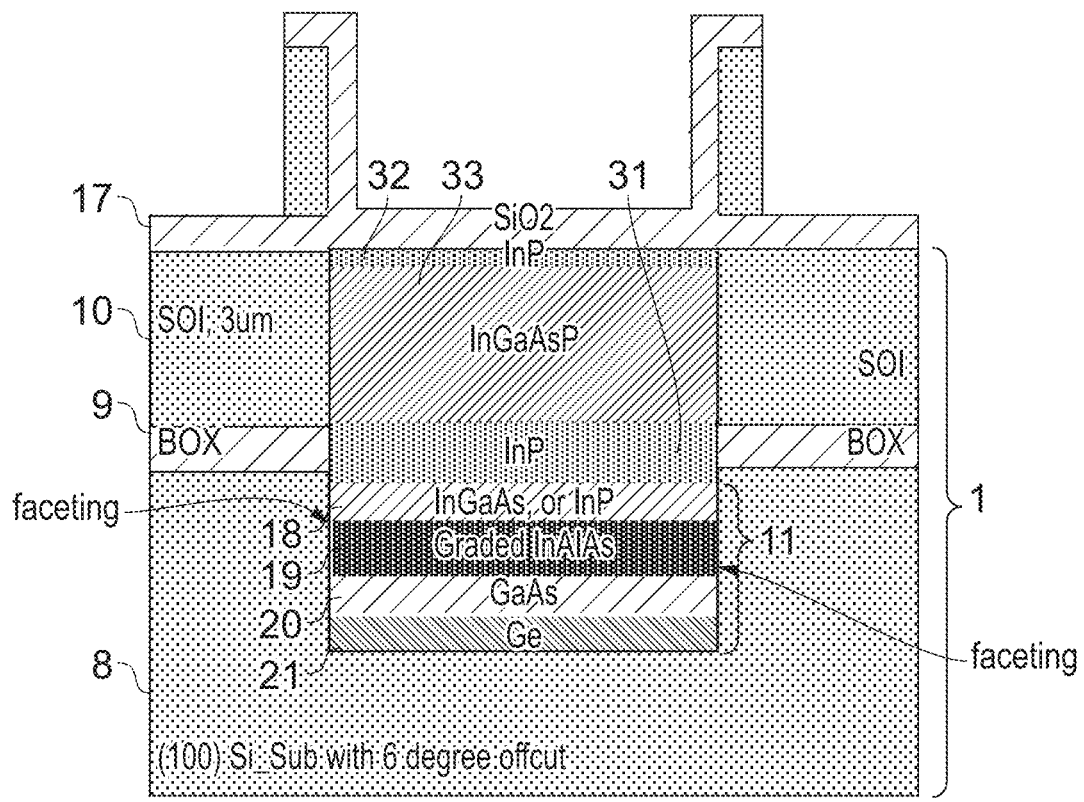
Figure 9E:
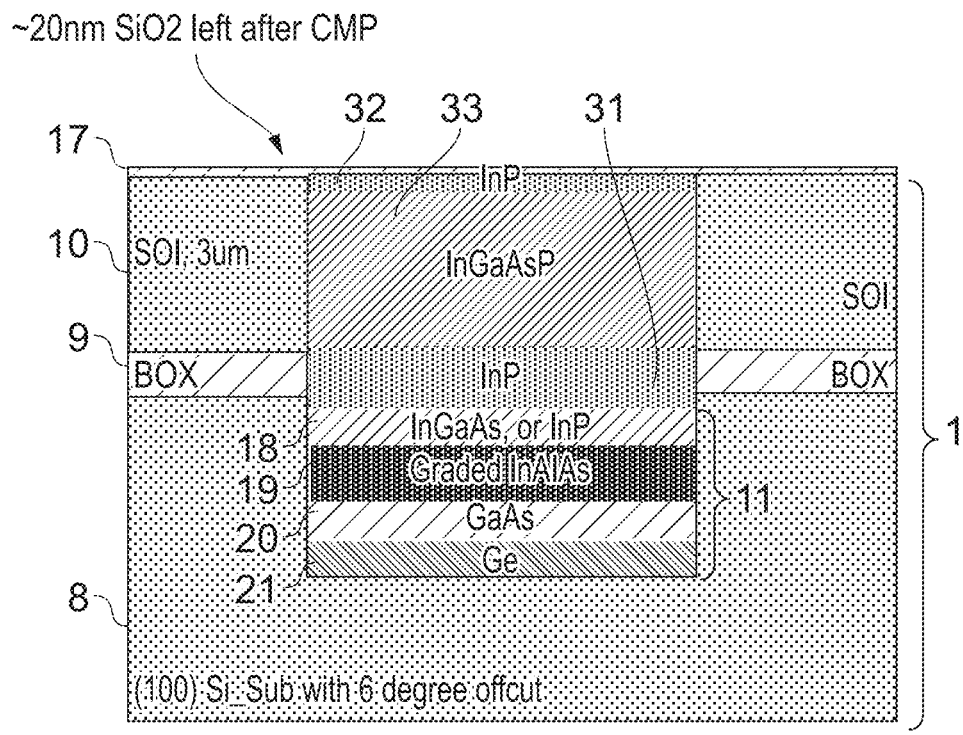
Figure 9F:
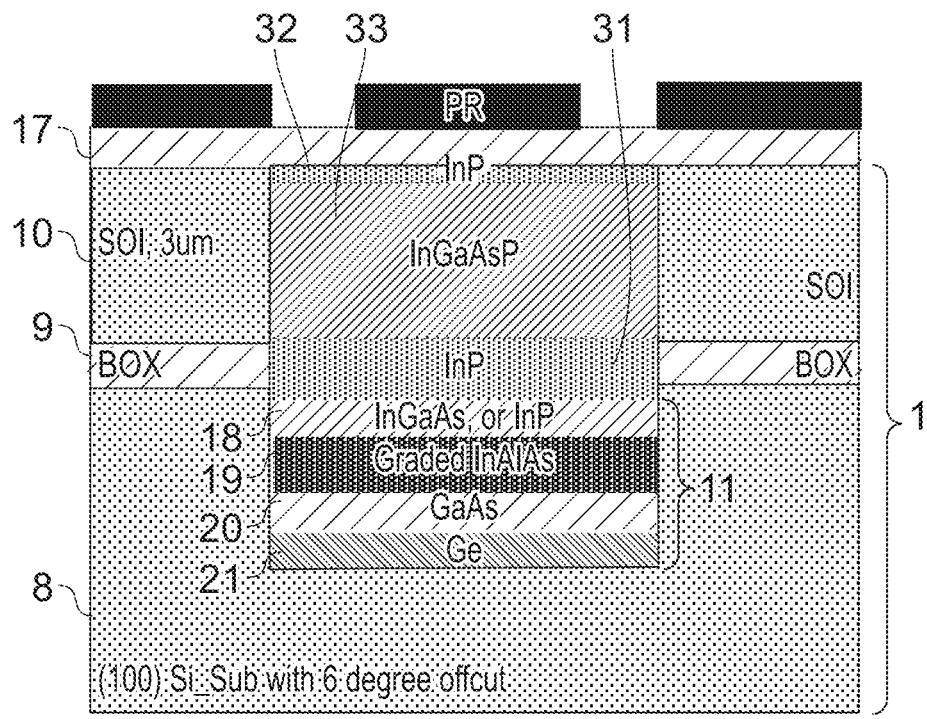
Figure 9G:
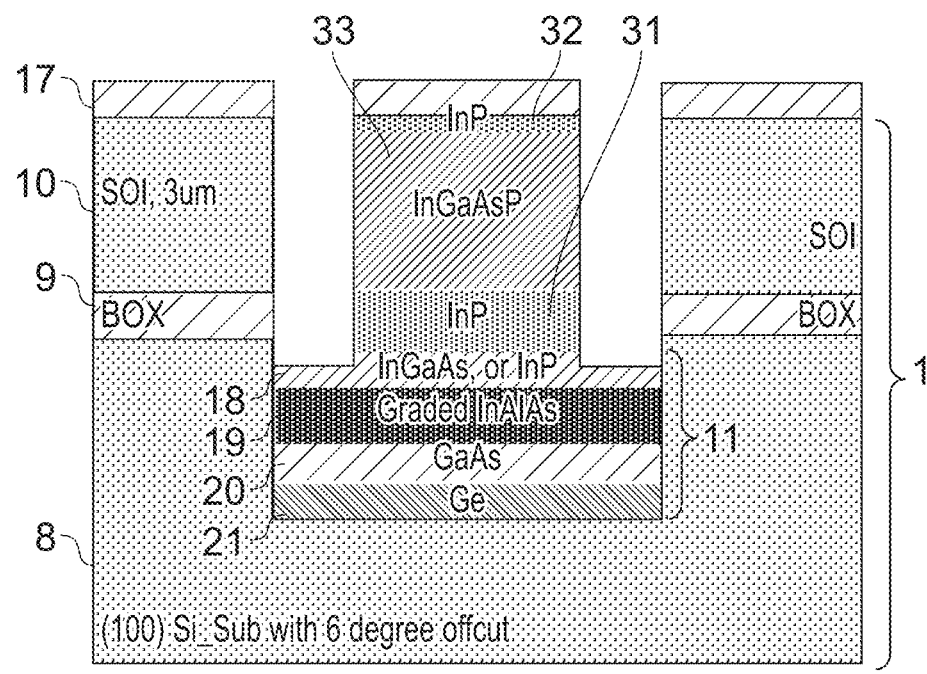
Figure 9H:
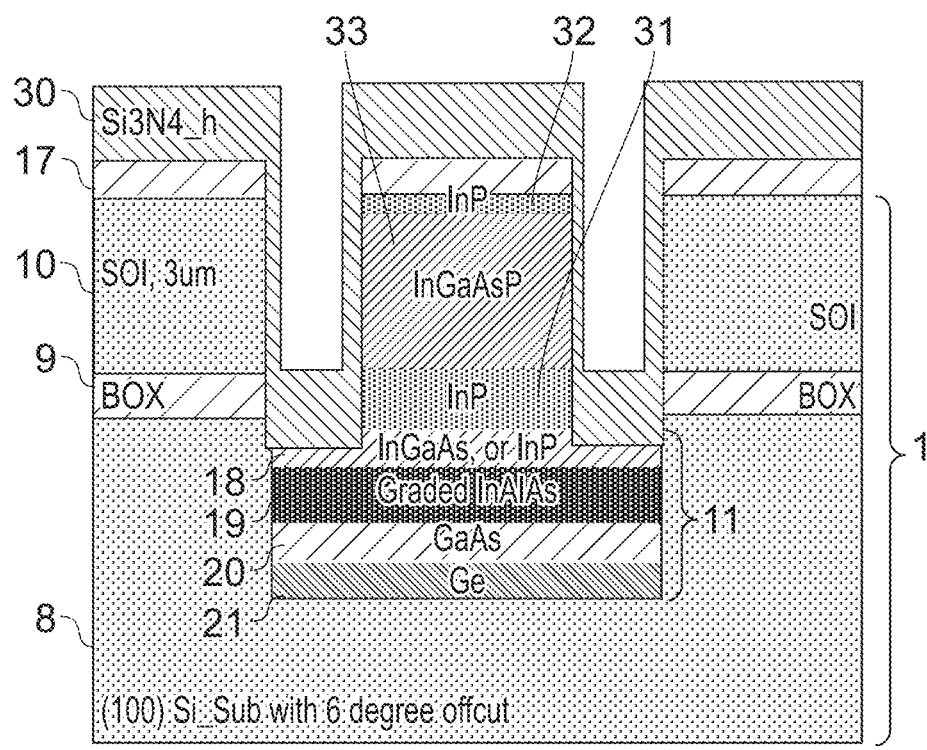
Figure 9I:
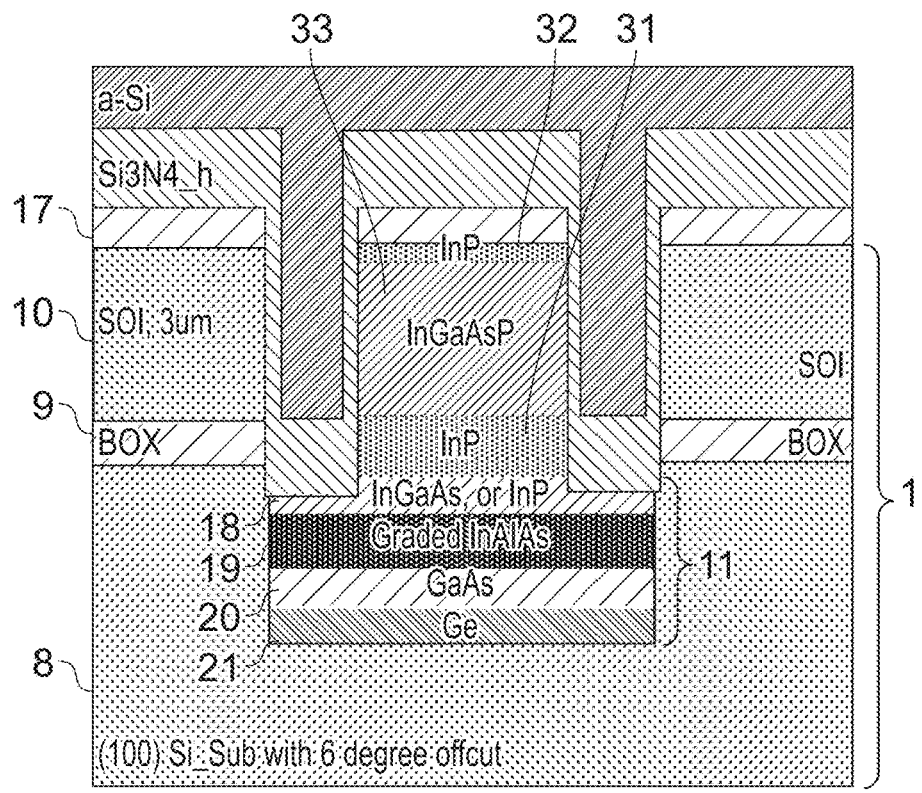
Figure 9J:
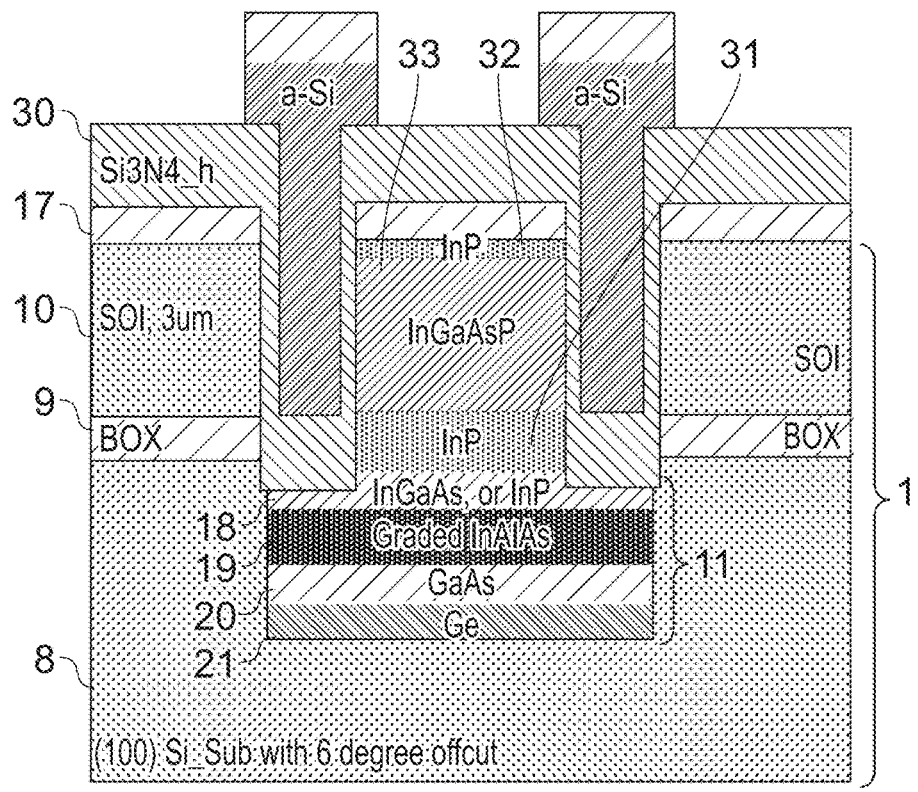
Figure 9K:
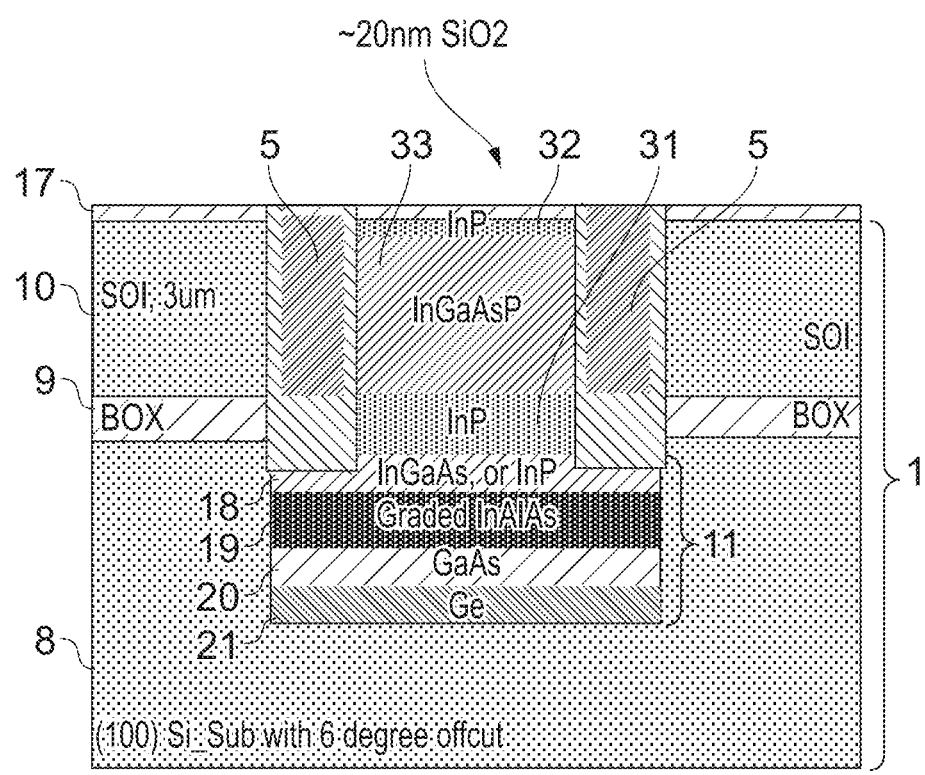
Figure 9L:
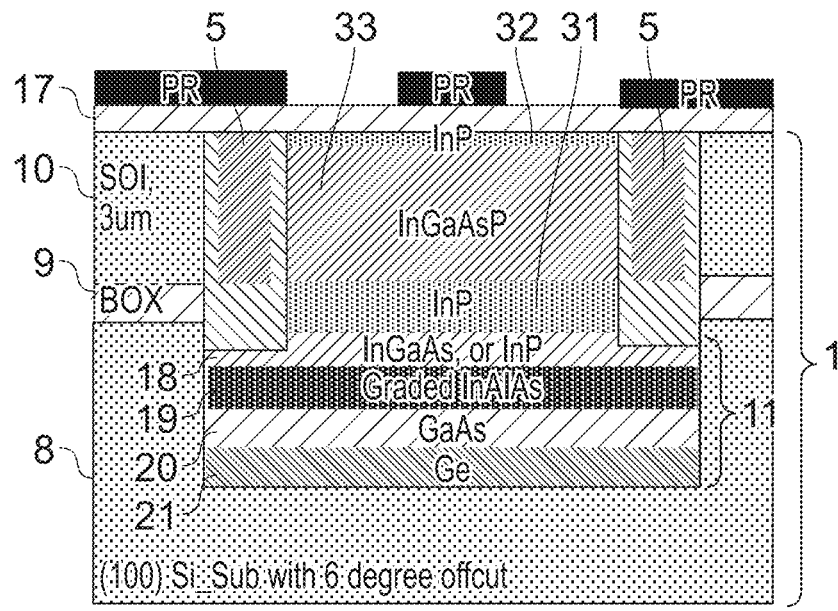
Figure 9L:
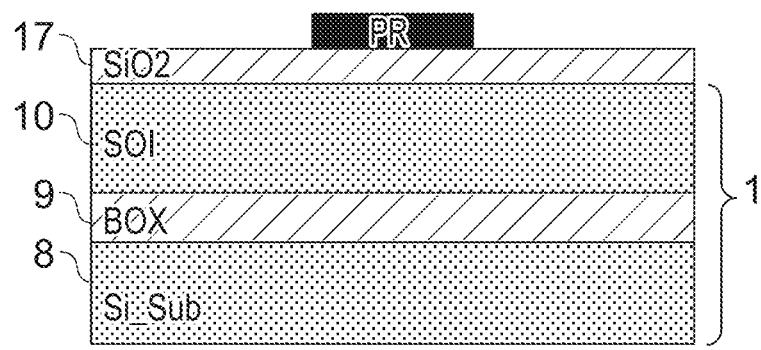
Figure 9M:
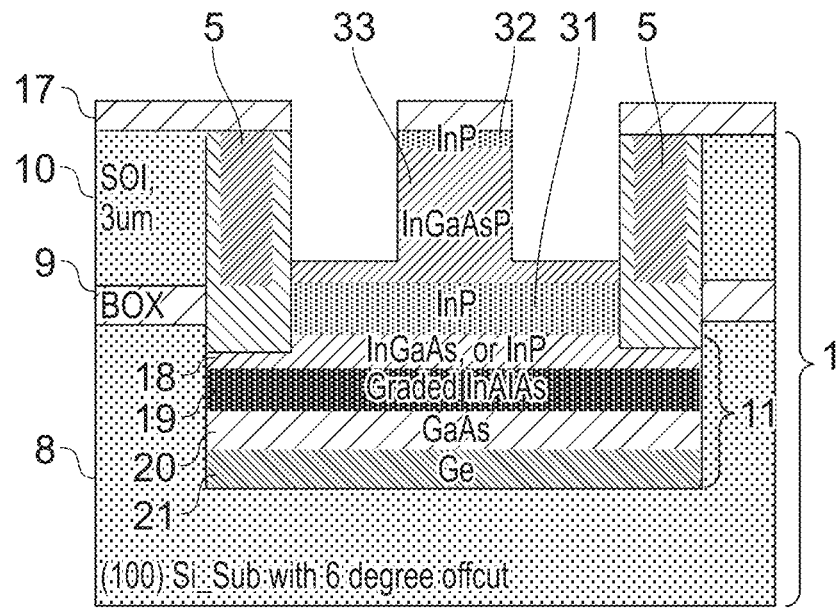
Figure 9M:
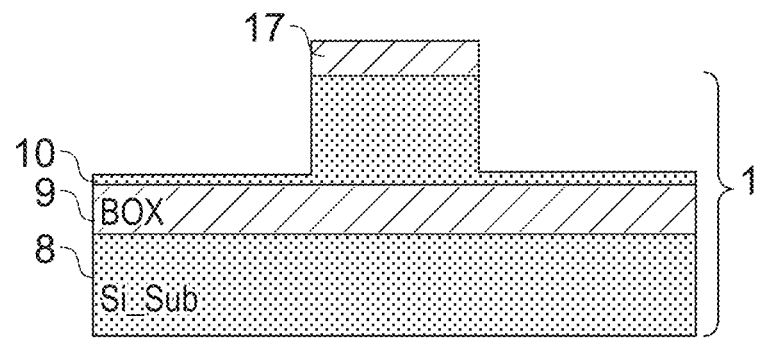
Figure 9N:
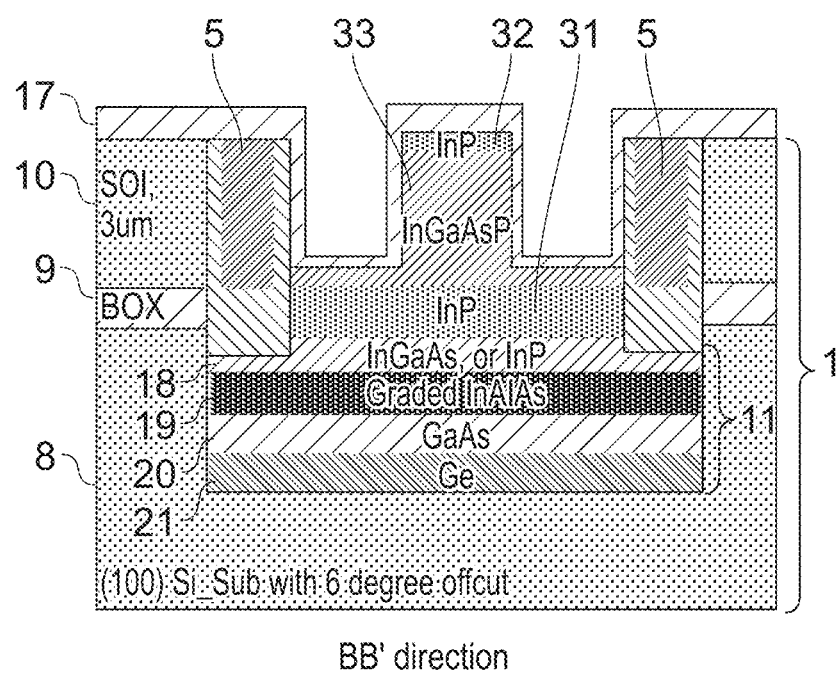
Figure 9O:
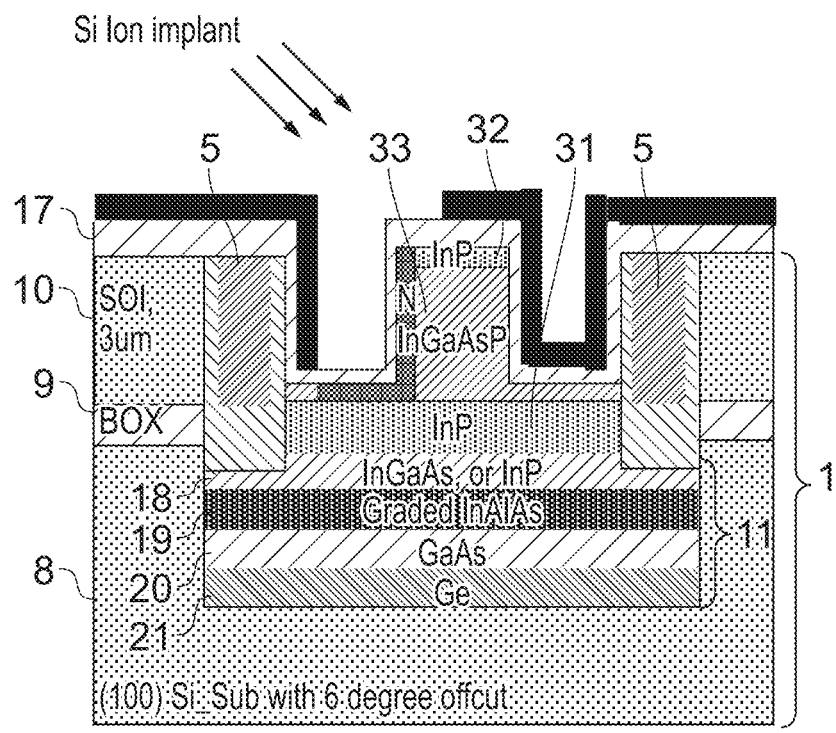
Figure 9P:
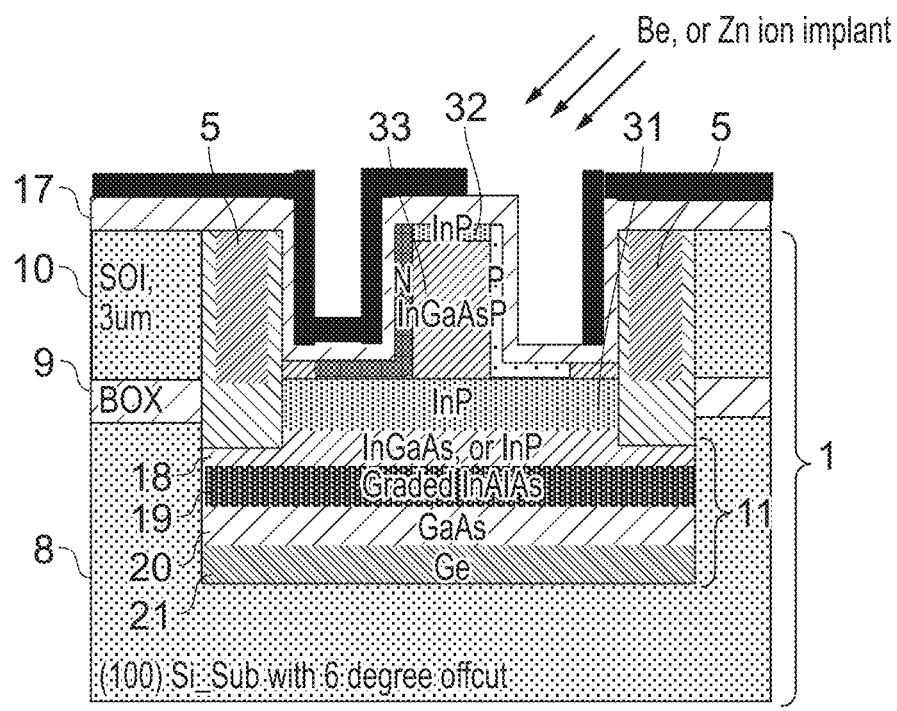
Figure 9Q:
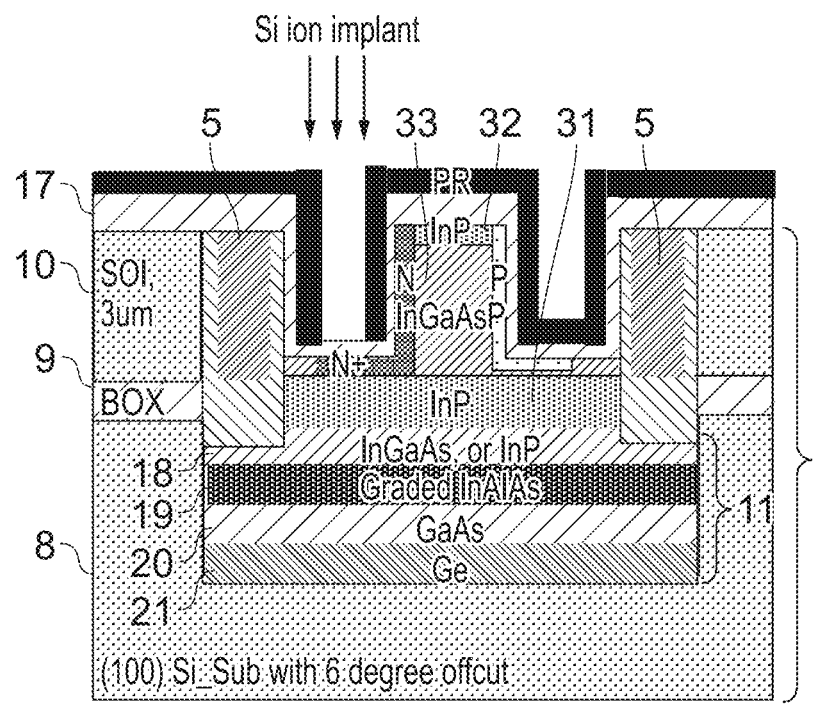
Figure 9R:
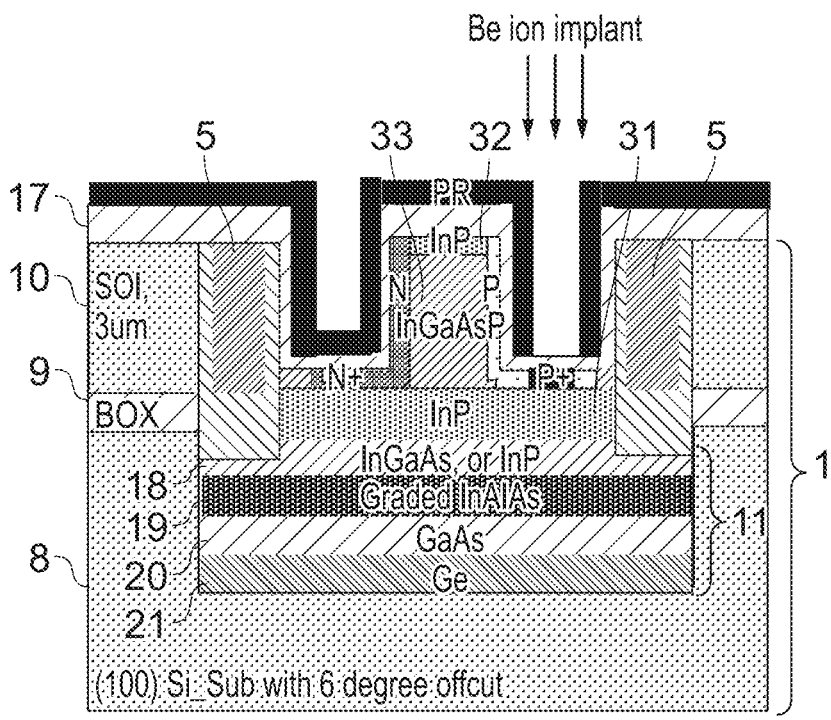
Figure 9S:
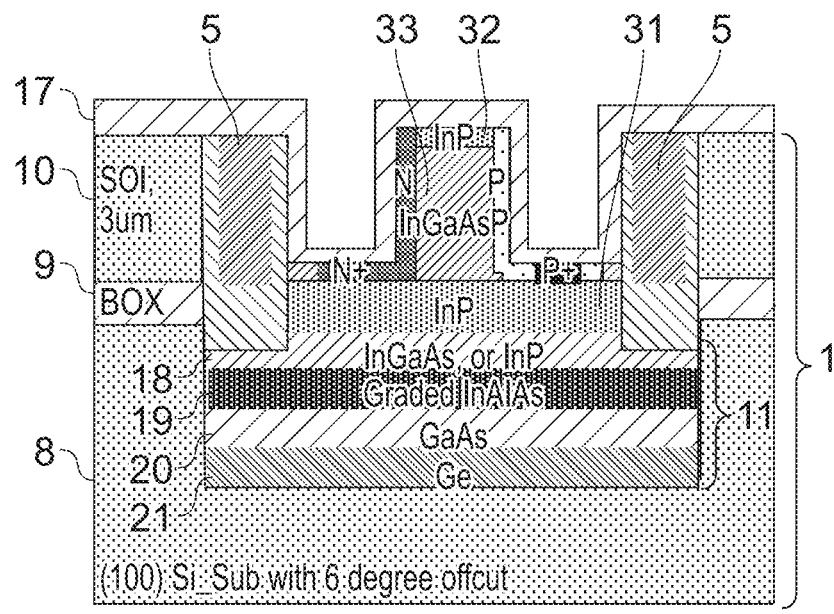
Figure 9T:
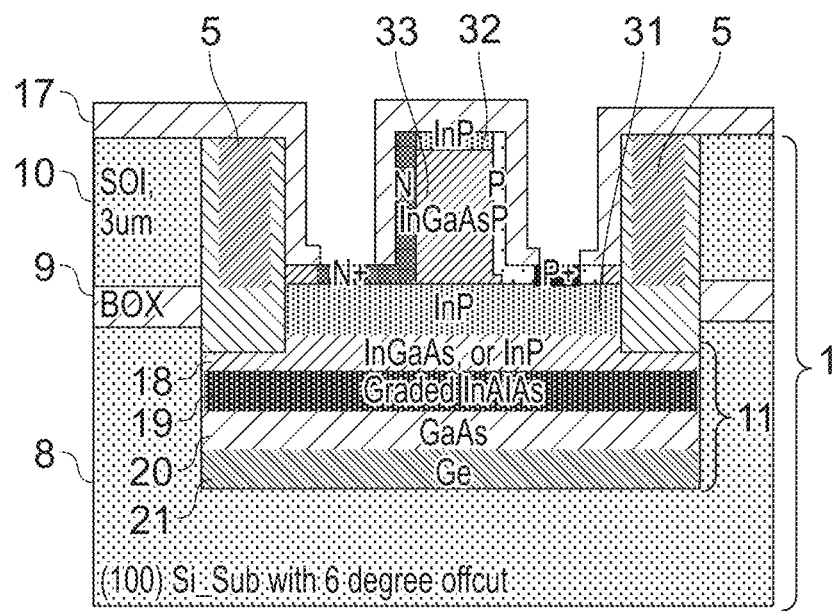
Figure 9U:
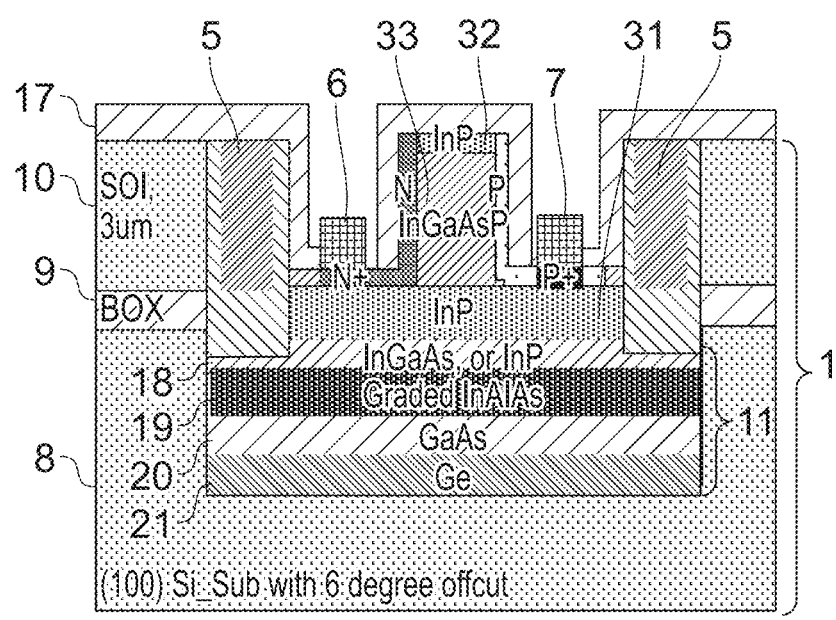

Another embodiment on a 3 μm SOI platform may be formed according to the following method with reference to FIGS. 9A to 9U.

The substrate is a SOI substrate with a SOI layer having a height of 3 μm. A layer of $SiO_2$ is deposited on the SOI layer and a substrate cavity 28 is formed in the substrate. The cavity extends through the $SiO_2$ layer, the SOI layer 10, the BOX layer 9 and into the silicon base layer 8. The distance the cavity extends to in the silicon base layer may be chosen such that the center mode of a silicon waveguide in the SOI layer aligns with the center mode of the electro-optically active stack to be deposited.

Then, 20 nm of $Si_3N_4$ is deposited on the sidewalls of the substrate cavity as shown in FIG. 9B. This may be achieved by non-isotropic etching.

Poly is deposited on the $Si_3N_4$ layer 16 and the buffer region and the electro-optically active stack are grown by epitaxial growth on the base of the substrate cavity. The layers forming the buffer region and the stack have faceting at the edges of the cavity as shown in FIG. 9C and FIG. 9D.

The buffer region 11 in this embodiment consists of a layer of Ge 21 on the base of the substrate cavity, a layer of GaAs 20 on the layer of Ge 21, a layer of graded InAlAs 19 on the layer of GaAs 20 and a layer of InGaAs or InP 18 on the layer of graded InAlAs 19. The electro-optically active stack includes a lower layer of InP 31, a layer of InGaAsP 33 and an upper layer of InP 32. When deposited, the layers may not doped and doping may occur later in the process. The bottom surface of the layer of InGaAsP 33 may have a height equal to the height of the bottom surface of the SOI layer.

Other layers may be added to the stack/buffer region, one or more layers may be omitted from the stack/buffer region and/or other layers may replace one or more layers in the stack/buffer region. The layers may be reordered.

A layer of $SiO_2$ is deposited on the device on the electro-optically active stack and the poly. Etching is performed on an area surrounding the substrate cavity, leaving the layer of $SiO_2$ on the stack and poly and $SiO_2$ between the area that was etched and the substrate cavity as shown in FIG. 9D. Chemical mechanical polishing (CMP) is then used to remove the remaining poly, leaving around 20 nm $SiO_2$ on the top surface of the stack as shown in FIG. 9E.

$SiO_2$ is then deposited on the device as a hard mask and patterned using photo resist 29 in preparation for etching the faceted region of the stack at the edges of the cavity as shown in FIG. 9F. The hard mask of $SiO_2$ is then used to etch the faceted edges of the stack to make channels and remove defects from the faceted edge regions. As is shown in FIG. 9G, the etch removes the faceted edges of the upper layer of InP 32, the layer of InGaAsP 33 and the lower layer of InP 31. The etch also removes an upper portion of the faceted edges of the layer of InGaAs or InP 18. The etch forms two channels, one at the edge of the substrate cavity adjacent the input waveguide and one at the edge of the substrate cavity adjacent the output waveguide.

Silicon-rich $Si_3N_4\_h$ is then deposited on the device as shown in FIG. 9H. The $Si_3N_4\_h$ forms a layer 30 on the $SiO_2$ layer and forms a layer in the base of each of the channels at the edges of the substrate cavity. The $Si_3N_4\_h$ is also deposited on the sidewalls of the channels with a thickness at the side walls of between 230 nm and 260 nm. The $Si_3N_4\_h$ has a refractive index of 2.7.

Amorphous silicon is then deposited to fill the channels and form a layer on the $Si_3N_4\_h$ as shown in FIG. 9I. $SiO_2$ is then deposited on amorphous silicon in the area above the channels and the amorphous silicon is then etched from the area surrounding the channels, leaving the amorphous silicon in and above the channels.

CMP is then used to remove the $SiO_2$, reduce the height of the remaining amorphous silicon, remove the $Si_3N_4\_h$ layer 30 and reduce the height of the $SiO_2$ layer on the stack to around 20 nm as shown in FIG. 9K.

Photoresist 29 is then used to pattern the $SiO_2$ layer in preparation for forming the waveguides to give the desired waveguide shape as shown in FIG. 9L which includes section views in directions B-B' and C-C' as depicted in FIG. 1.

A rib waveguide is formed in the stack as shown in FIG. 9M by etching trenches through the upper layer of InP 32, the layer of InGaAsP 33 and the lower layer of InP 31. The trenches also extend into an upper portion of the layer of InGaAs or InP 18. The ridge of the rib waveguide is formed by the stack between the etched trenches. At the same time, the input and output waveguides are formed by etching the $SiO_2$ layer and the SOI layer 10 to form a rib waveguide as can be seen in the C-C' view of FIG. 9M.

A layer of SiO₂ of approximately 20-50 nm thickness is then deposited on the device to protect the device. Photoresist is added as shown in FIG. 9O to cover the device except for the SiO₂ layer at a base of a first one of the etched trenches, the sidewall of the first trench at the ridge of the waveguide and a portion of the top surface of the ridge of the waveguide. A first sidewall of the upper InP layer 32, and the slab portion of the waveguide beneath the trench are then N doped by silicon ion implant. The remainder of the device is not doped due to the presence of the photoresist.

The exposed portions are then covered with photoresist and the SiO₂ on the base of the other, second, trench, the sidewall of the second trench on the ridge of the waveguide and a portion of the top surface of the ridge waveguide is exposed. The second sidewall of the upper InP layer 32, the slab portion of the waveguide beneath this trench are then P doped by Be or Zn ion implant as seen in FIG. 9P. The exposed portions are re-covered with photoresist.

The photoresist on a portion of the SiO₂ on the base of the first trench is removed. Then a portion of the slab beneath the first trench is further doped by silicon ion implant as seen in FIG. 9Q to form a N+ doped region in the slab of the waveguide. The exposed portion is re-covered with photoresist. The N+ region has an N dopant concentration greater than the rest of the N doped region.

The photoresist on a portion of the SiO₂ on the base of the second trench is removed. Then a portion of the slab beneath the second trench is further doped by Be ion implant as seen in FIG. 9R to form a P+ doped region in the slab of the waveguide. The photoresist is then removed. The P+ region has a P dopant concentration greater than the rest of the P doped region.

The order of the doping steps may be rearranged as practical.

500 nm of SiO₂ is then deposited on the device and rapid thermal annealing (RTA) is performed at 700-850 degrees C. as illustrated in FIG. 9S.

Portions of the SiO₂ layer above the N+ and P+ regions are then removed to form contact vias (FIG. 9T) and the contact vias are metallized as shown in FIG. 9U.

The resulting EAM device is shown in FIG. 9U. The EAM is formed on a SOI platform 1 including a silicon base layer 8, a buried oxide layer 9 and a SOI layer 10. The EAM shown in FIG. 9U is on a 3 μm SOI platform where the SOI layer 10 has a height of 3 μm, but in other embodiments, other platform sizes may be used. The silicon base layer may be a (100) silicon substrate with 6 degree offcut.

A substrate cavity extends through the SOI layer 10, through the BOX layer 9 and into the silicon base layer 8. The base of the cavity is formed in the silicon base layer 8.

An electro-optically active stack is formed within the substrate cavity. The stack is formed of the lower layer of InP 31, the layer of InGaAsP 33 and the upper layer of InP 32. The layer of InGaAsP 33 and the upper layer of InP are N doped on one side and P doped on the opposing side (left and right sides respectively as shown in FIG. 9U). The slab region of the rib waveguide formed in the stack is formed of the lower InP layer 31 and a portion of the layer of InGaAsP 33. The slab is N doped on a portion of one side and P doped on a portion of the opposing side (left and right sides respectively as shown in FIG. 9U). A top surface of the stack has a height equal to a height of the top surface of the SOI layer 10 so that the stack does not protrude above the top of the substrate cavity.

In this embodiment, a PIN junction is formed horizontally between the P and N doped regions on either side of the electro-optically active stack.

The buffer region 11 beneath the electro-optically active waveguide consists of a layer of Ge 21 on the base of the substrate cavity, a layer of GaAs 20 on the layer of Ge 21, a layer of graded InAlAs 19 on the layer of GaAs 20 and a layer of InGaAs or InP 18 on the layer of graded InAlAs 19. The buffer region 11 is on the base of the substrate cavity. The electro-optically active stack is on the buffer region 11.

Other layers may be added to the stack/buffer region, one or more layers may be omitted from the stack/buffer region and/or other layers may replace one or more layers in the stack/buffer region. The layers may be reordered.

Electrode 6 contacts the N+-doped region of the slab of the electro-optically active stack and electrode 7 contacts the P+-doped region of the slab of the electro-optically active stack.

The amorphous silicon zones 5 are between the input waveguide 3 and the electro-optically active stack and between the electro-optically active stack and the output waveguide 4 as in the above described embodiments. The amorphous silicon zones 5 are surrounded by Si₃N₄.

An example of the heights and compositions of layers used in this embodiment are shown in Table 4 for an EAM with a bulk III-V material utilising the FK effect on a 3 μm SOI platform. The InGaSaP layer may be replaced by a AlInGaAs layer.

Tables:

TABLE 1

EAM EPI stack with InGaNAs MQW (QCSE)

| Layer | R | n/u/p | Material | Thick (nm) | Doping (10^18) | Dopant | Note |
|---|---|---|---|---|---|---|---|
| 18 | 1 | p | GaAs | 200 | 10 | Be | |
| 14 | 1 | p | AlGaAs | 1500 | 1 | Be | |
| 13 | 1 | uid | GaAs | 70 | | | |
| 12 | 12x | uid | GaAsN | 10 | | | |
| 11 | 12x | active | InGaNAs | 7 | | | |
| 10 | 1 | uid | GaAsN | 10 | | | |
| | 1 | uid | GaAs | 70 | | | |
| | 1 | n | AlGaAs | 1500 | 1 | Si | |
| 8 | 1 | n | GaAs | 200 | 1 | Si | |
| 3 | 1 | uid | GaAs | 1000 | | | |
| 2 | 1 | uid | Ge | 1000 | | | |
| 1 | | | Substrate: (100) Si with 6 degree off cut | | | | |

TABLE 2

EAM EPI stack with Bulk III-V material with FK effect

| Layer | R | n/u/p | Material | Thick (nm) | Doping (10^18) | Dopant | Note |
|---|---|---|---|---|---|---|---|
| 9 | 1 | p | InGaAs | 400 | 1 | Zn | |
| 8 | 1 | p | InGaAsP | 50 | 1.5 | Zn | |
| 7 | 1 | p | InP | 1340 | 1 | Zn | |
| 6 | 1 | uid | InGaAsP | 500 | | | |
| 5 | 1 | n | InP | 80 | 0.2 | Si | |
| 4 | 1 | n | InP | 70 | 0.5 | Si | |
| 3 | 1 | n | InP | 920 | 0.8 | Si | |
| 5 | 1 | uid | InGaAs, or InP | 500 | | | |
| 4 | 1 | uid | InAlAs | 1300 | | | Graded buffer layer |
| 3 | 1 | uid | GaAs | 1000 | | | |
| 2 | 1 | uid | Ge | 1000 | | | |
| 1 | | | Substrate: (100) Si with 6 degree off cut | | | | |

TABLE 3

EAM EPI stack with AlInGaAs MQW (QCSE)

| Layer | R | n/u/p | Material | Thick (nm) | Doping (10^18) | Dopant | Note |
|---|---|---|---|---|---|---|---|
| 18 | 1 | p | InGaAs | 400 | 1 | Zn | |
| 17 | 1 | p | InGaAsP | 50 | 1.5 | Zn | |
| 16 | 1 | p | InP | 1340 | 1 | Zn | |
| 15 | 1 | p | InGaAsP | 20 | 1 | Zn | |
| 14 | 1 | p | AlInGaAs | 60 | 1 | C | |
| 13 | 1 | uid | AlInGaAs | 70 | | | |
| 12 | 12x | uid | AlInGaAs | 7 | | | |
| 11 | 12x | active | AlInGaAs | 9 | | | |
| 10 | 1 | uid | AlInGaAs | 7 | | | |
| 9 | 1 | uid | InGaAsP | 77 | | | |
| 8 | 1 | n | InP | 80 | 0.2 | Si | |
| 7 | 1 | n | InP | 70 | 0.5 | Si | |
| 6 | 1 | n | InP | 920 | 0.8 | Si | |
| 5 | 1 | uid | InGaAs, or InP | 500 | | | |
| 4 | 1 | uid | InAlAs | 1300 | | | Graded buffer layer |
| 3 | 1 | uid | GaAs | 1000 | | | |
| 2 | 1 | uid | Ge | 1000 | | | |
| 1 | | | Substrate: (100) Si with 6 degree off cut | | | | |

TABLE 4

EAM EPI stack with 3 um Bulk III-V material with FK effect

| Layer | R | n/u/p | Material | Thick (nm) | Note |
|---|---|---|---|---|---|
| 5 | 1 | uid | InP | 200 | |
| 4 | 1 | uid | InGaAsP (or AlInGaAs) | 2800 | |
| 3 | 1 | uid | InP | 1000 | |
| 5 | 1 | uid | InGaAs, or InP | 500 | |
| 4 | 1 | uid | InAlAs | 1300 | Graded buffer layer |
| 3 | 1 | uid | GaAs | 1000 | |
| 2 | 1 | uid | Ge | 1000 | |
| 1 | | | Substrate: (100) Si with 6 degree off cut | | |

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An electro-optically active device comprising:
a silicon on insulator (SOI) substrate including a silicon base layer, a buried oxide (BOX) layer on top of the silicon base layer, a silicon on insulator (SOI) layer on top of the BOX layer, and a substrate cavity which extends through the SOI layer, the BOX layer and into the silicon base layer, such that a base of the substrate cavity is formed by a portion of the silicon base layer;
an electro-optically active waveguide including an electro-optically active stack within the substrate cavity; and
a buffer region within the substrate cavity beneath the electro-optically active waveguide, the buffer region comprising a layer of Ge,
wherein the buffer region further comprises a layer of graded InAlAs.

2. An electro-optically active device according to claim 1, wherein the buffer region further comprises a layer of GaAs.

3. An electro-optically active device according to claim 1 wherein the buffer region comprises:
a layer of InGaAs or InP, said layer located on top of the layer of graded InAlAs, the layer of graded InAlAs located on top of a layer of GaAs, the layer of GaAs located on top of the layer of Ge.

4. An electro-optically active device according to claim 3, wherein the layer of Ge has a thickness of 1000 nm+/−20%, and/or the layer of GaAs has a thickness of 1000 nm+/−20%, and/or the layer of graded InAlAs has a thickness of 1300 nm+/−30%, and/or the layer of InGaAs or InP has a thickness of 500 nm-1000 nm.

5. An electro-optically active device according to claim 1 wherein the buffer region consists of intrinsic or unintentionally doped materials.

6. An electro-optically active device according to claim 1, wherein the electro-optically active stack is located directly on top of the buffer region.

7. An electro-optically active device according to claim 6, wherein an interface between the electro-optically active stack and the buffer region is positioned deeper in the substrate cavity than an interface between the silicon base layer and the BOX layer in the SOI substrate, such that a portion of the electro-optically active stack is positioned at the same height as a portion of the silicon base layer.

8. An electro-optically active device according to claim 1 wherein the electro-optically active stack comprises a layer of a III-V semiconductor.

9. An electro-optically active device according to claim 1 wherein the electro-optically active stack includes a multiple quantum well region.

10. An electro-optically active device according to claim 1 wherein the electro-optically active stack forms an electro-absorption modulator (EAM).

11. An electro-optically active device according to claim 1, wherein the electro-optically active waveguide is configured such that optical properties of the electro-optically active waveguide are modifiable according to the QCSE effect or the FK effect.

12. An electro-optically active device comprising:
a silicon on insulator (SOI) substrate including a silicon base layer, a buried oxide (BOX) layer on top of the silicon base layer, a silicon on insulator (SOI) layer on top of the BOX layer, and a substrate cavity which extends through the SOI layer, the BOX layer and into the silicon base layer, such that a base of the substrate cavity is formed by a portion of the silicon base layer;
an electro-optically active waveguide including an electro-optically active stack within the substrate cavity;
a buffer region within the substrate cavity beneath the electro-optically active waveguide, the buffer region comprising a layer of Ge; and
a channel between the electro-optically active stack and a sidewall of the substrate cavity,
wherein the channel is filled with a liner and a filling material with a refractive index similar to or greater than that of a material forming a sidewall of the substrate cavity to thereby form a bridge-waveguide in the channel between the SOI layer and the electro-optically active stack.

13. An electro-optically active device according to claim 12, wherein the filling material is amorphous silicon or silicon-germanium (SiGe), and the liner is formed of silicon nitride ($Si_3N_4$).

14. An electro-optically active device according to claim 12, wherein a bottom surface of the filling material is aligned with a top surface of the BOX layer.

15. An electro-optically active device comprising:
a silicon on insulator (SOI) substrate including a silicon base layer, a buried oxide (BOX) layer on top of the silicon base layer, a silicon on insulator (SOI) layer on top of the BOX layer, and a substrate cavity which extends through the SOI layer, the BOX layer and into the silicon base layer, such that a base of the substrate cavity is formed by a portion of the silicon base layer;
an electro-optically active waveguide including an electro-optically active stack within the substrate cavity; and
a buffer region within the substrate cavity beneath the electro-optically active waveguide, the buffer region comprising a layer of Ge,
wherein a top surface of the electro-optically active stack is positioned higher than a top surface of the SOI layer such that a portion of the electro-optically active stack protrudes from the substrate cavity.

16. An electro-optically active device according to claim 15 further comprising a layer of silicon nitride ($Si_3N_4$) on top of the SOI layer, a top surface of the layer of silicon nitride having a height above the SOI substrate equal to a height of the portion of the electro-optically active stack that protrudes from the substrate cavity, such that a top surface of the layer of silicon nitride is aligned with the top surface of the electro-optically active stack.

17. An electro-optically active device comprising:
a silicon on insulator (SOI) substrate including a silicon base layer, a buried oxide (BOX) layer on top of the silicon base layer, a silicon on insulator (SOI) layer on top of the BOX layer, and a substrate cavity which extends through the SOI layer, the BOX layer and into the silicon base layer, such that a base of the substrate cavity is formed by a portion of the silicon base layer;
an electro-optically active waveguide including an electro-optically active stack within the substrate cavity;
a buffer region within the substrate cavity beneath the electro-optically active waveguide, the buffer region comprising a layer of Ge;
a first electrode contact on a first doped region, the first doped region forming a lowest layer of the electro-optically active stack;
an isolation cavity in the first doped region;
an insulating material located on a side surface of the electro-optically active stack and extending into the isolation cavity in the first doped region and lining the isolation cavity; and
a second electrode contact on a second doped region, the second doped region forming a top layer of the electro-optically active stack, the second electrode contact extending from the second doped region along the insulating material and into the isolation cavity in the first doped region.

* * * * *